US012724005B2

(12) United States Patent
Mehdi et al.

(10) Patent No.: US 12,724,005 B2
(45) Date of Patent: Sep. 1, 2026

(54) METHOD AND APPARATUS OF CHARACTERIZING LIQUID

(71) Applicant: THE UNIVERSITY OF LIVERPOOL, Liverpool (GB)

(72) Inventors: Beata Layla Mehdi, Liverpool (GB); Juhan Lee, Liverpool (GB)

(73) Assignee: The University of Liverpool, Liverpool (GB)

( * ) Notice: Subject to any disclaimer, the term of this patent is extended or adjusted under 35 U.S.C. 154(b) by 468 days.

(21) Appl. No.: 18/277,903

(22) PCT Filed: Feb. 21, 2022

(86) PCT No.: PCT/GB2022/050466

§ 371 (c)(1),
(2) Date: Aug. 18, 2023

(87) PCT Pub. No.: WO2022/175686

PCT Pub. Date: Aug. 25, 2022

(65) Prior Publication Data

US 2024/0310324 A1 Sep. 19, 2024

(30) Foreign Application Priority Data

Feb. 21, 2021 (GB) ..................................... 2102420

(51) Int. Cl.

| | |
|---|---|
| ***G01N 27/41*** | (2006.01) |
| ***G01N 23/22*** | (2018.01) |
| ***G01N 23/2251*** | (2018.01) |
| ***G01N 27/416*** | (2006.01) |
| ***G01N 27/48*** | (2006.01) |

(52) U.S. Cl.

CPC ..... *G01N 27/4168* (2013.01); *G01N 23/2251* (2013.01); *G01N 27/48* (2013.01)

(58) Field of Classification Search

CPC . G01N 27/4168; G01N 27/48; G01N 23/2251
See application file for complete search history.

(56) References Cited

U.S. PATENT DOCUMENTS

2012/0142850 A1* 6/2012 Muhlebach ............. C08L 51/06 428/402

OTHER PUBLICATIONS

International Search Report and Written Opinion for International Patent Application No. PCT/GB2022/050466 dated Apr. 12, 2022, 13 pages.

Sutter, Eli A. et al., "In situ liquid cell electron microscopy of Ag—Au galvanic replacement reactions", vol. 9, No. 3, Jan. 1, 2017 (Abstract), RSC Publishing, 8 pages.

GB Search Report for GB Application No. GB2102420.3, dated Nov. 3, 2021, 4 pages.

(Continued)

*Primary Examiner* — Nicole M Ippolito
(74) *Attorney, Agent, or Firm* — Michael M. McCraw; Womble Bond Dickinson (US)LLP

(57) ABSTRACT

A method of characterizing a liquid exposed to ionizing radiation is provided. The method includes including an oxidizing agent and/or a reducing agent of a redox pair in the liquid, thereby providing a corresponding redox couple; and determining a first redox potential due, at least in part, to the redox couple while exposing the liquid to the ionizing radiation.

15 Claims, 17 Drawing Sheets

(56) References Cited

OTHER PUBLICATIONS

J. M. Grogan et al., "Bubble and pattern formation in liquid induced by an electron beam", Nano Lett., 2014, 14, 359-364, 22 pages.
N. M. Schneider et al., "Electron-Water Interactions and Implications for Liquid Cell Electron Microscopy", The Journal of Physical Chemistry C, 2014, 118, 22373-22382.
C. Wang et al., "Precise In Situ Modulation of Local Liquid Chemistry via Electron Irradiation in Nanoreactors Based on Graphene Liquid Cells", Adv. Mater., 2016, 28, 7716-7722.
B. Ambrozič et al., "Controlling the radical-induced redox chemistry inside a liquid-cell TEM", Chemical Science, 2019, 10, 8735-8743.
Mehdi, B. et al., "The Impact of Li Grain Size on Coulombic Efficiency in Li Batteries", Sci Rep 6, 34267 (2016), https://doi.org/10.1038/srep34267, 8 pages.
Comte et al., "Spontaneous grafting of 9,10-phenanthrenequinone on porous carbon as an active electrode material in an electrochemical capacitor in an alkaline electrolyte", J. Mater. Chem. A, 2015, 3 (11), p. 6146-6156.
International Search Report and Written Opinion for International Application No. PCT/GB2022/050466, dated Jun. 21, 2022, 17 pages.
Sutter Eli A. et al, "In situ liquid cell electron microscopy of Ag—Au galvanic replacement reactions", NANOSCALE, vol. 9, No. 3, Jan. 1, 2017, 8 pages.
Krishtalik, L. I., "pH-dependent redox potential: how to use it correctly in the activation energy analysis", Elsevier Science B.V. (2003), DOI: https://doi.org/10.1016/S0005-2728(03)00020-3, 9 pages.
Ugulava, N. B. et al., "CD-monitored redox titration of the Rieske Fe—S protein of Rhodobacter sphaeroides: pH dependence of the midpoint potential in isolated bc1 complex and in membranes", FEBS Letters 440 (1998), https://doi.org/10.1016/S0014-5793(98)01493-8, pp. 409-413.
Frackowiak, E. et al., "Electrochemistry Serving People and Nature: High-Energy Ecocapacitors based on Redox-Active Electrolytes", ChemSusChem (2012), 5, DOI 10.1002/cssc.201200227, pp. 1181-1185.

* cited by examiner

S1101

S1102

METHOD AND APPARATUS OF CHARACTERIZING LIQUID

CROSS-REFERENCE TO RELATED APPLICATIONS

The present application is a national phase entry of PCT Application No. PCT/GB2022/050466, filed Feb. 21, 2022, which claims the benefit of priority of Great Britain Application No. 2102420.3, filed Feb. 21, 2021, the entire contents of which are hereby incorporated by reference in their entirety for all purposes.

FIELD

The present invention relates to characterizing a liquid exposed to ionizing radiation.

BACKGROUND

In recent decades, in-situ transmission electron microscopy (TEM) analysis has played an unprecedentedly important role in terms of unveiling and understanding physical, chemical, and biological phenomena on the scale of micro-, nano, and even sub-nanometre. Particularly, through the latest development of liquid-filled holder, the research object for in-situ TEM has no longer been limited to the conventional solid-state samples in vacuum or gas environment only. Consequently, the sample system has been extended to the matters containing liquid, liquid-solid, or liquid-solid-gas phases in various research disciplines such as corrosion, electrochemical energy storage, catalysis, biology, and material synthesis. While significantly contributing to both fundamental and application-driven science, liquid-filled in-situ TEM analysis has distinctly overcome the limitation of post-mortem analysis and demonstrated its powerful feature not only for visualisation but also for the characterisation of chemical, crystal, and electronic properties. For continuous scientific breakthrough, one of the most significant remaining challenges of liquid-filled in-situ TEM analysis, however, is the comprehensive understanding of electron-beam induced radiolysis damage.

In many cases of liquid-filled TEM analysis, liquid-phase samples undergo dissociation process as a consequence of high-energy electron beam. For instance, as illustrated in FIG. 1A, upon electron beam irradiation, water molecules can be ionised ($H_2O$+$e^-$) or excited ($H_2O^+$), which will further convert to the species such as hydrogen radical $H^+$, hydroxyl radical $OH^+$, and solvated electrons $$e_h^-$$

about picoseconds after the first energy transfer. After about microseconds, the chemical products generated by electron beam radiation reaches a homogeneous stage, and the chemical yields at this stage are conventionally represented as G-values.

In stark contrast to the radiolysis studies with neutrons, photons, and γ-rays, only a handful of studies has been reported regarding the theoretical understanding of radiation chemistry for liquid-filled in-situ TEM. For instance, as demonstrated by Schneider and Grogan et al. electron beam-induced radiolysis process for water can be simulated for homogeneous systems by relying on the G-values and considering various available chemical reactions, as well as heterogeneous systems by incorporating diffusion equations. Based on this model, Wang et al. investigated the correlation of simulated $H_2$ concentration with experimentally observed $H_2$ gas bubble formation. Ambrožič et al. introduced a further modification to this model introducing temperature dependency by assuming a linear relationship between the G-value and the temperature, including the pressure estimation based on $H_2$ and $O_2$ concentration. Since the bubble formation of the latter species can be easily visible during in-situ TEM analysis, the theoretically predicted behaviour of electron beam-induced water radiolysis process has been investigated by experimentally observing the formation of gas bubbles.

Hence, there is a need to characterize exposure of a liquid to ionizing radiation.

BRIEF SUMMARY

It is one aim of the present invention, amongst others, to provide a method of characterizing a liquid exposed to ionizing radiation which at least partially obviates or mitigates at least some of the disadvantages of the prior art, whether identified herein or elsewhere. For instance, it is an aim of embodiments of the invention to provide a method of characterizing a liquid exposed to ionizing radiation that provides qualitative and/or quantitative information relating to radiolysis of the liquid.

A first aspect provides a method of characterizing a liquid exposed to ionizing radiation, the method comprising:

including an oxidizing agent and/or a reducing agent of a redox pair in the liquid, thereby providing a corresponding redox couple;

determining a first redox potential due, at least in part, to the redox couple while exposing the liquid to the ionizing radiation.

A second aspect provides a liquid-phase TEM cell comprising an oxidizing agent and/or a reducing agent of a redox pair for contacting with a liquid receivable therein.

A third aspect provides use of quinone/hydroquinone for in situ pH calculation of a liquid during liquid-phase TEM thereof.

DESCRIPTION OF THE SEVERAL VIEWS OF THE DRAWINGS

For a better understanding of the invention, and to show how exemplary embodiments of the same may be brought into effect, reference will be made, by way of example only, to the accompanying diagrammatic Figures, in which:

FIG. 1A schematically illustrates ionisation and excitation of water molecules upon electron beam irradiation. FIG. 1B shows steady-state concentrations of radiolytic products under homogeneous beam irradiation as a function of a dose rate. FIGS. 1C and 1D show temporal concentration profiles of the radiolytic products at the beam centre under a heterogeneous condition. In more detail, FIG. 1D shows concentration profiles of $H^+$ and $OH^-$ ions at the beam centre and the cell boundary under beam-on and beam-off conditions.

FIG. 2A shows a cyclic voltammogram obtained at 100 mV/s for a pH 8.91 buffered aqueous electrolyte containing 0.01 M $H_2Q$ and 0.1 M KCl. FIG. 2B shows the redox potential shifting to positive potentials as pH of the electrolyte decreases. FIG. 2C shows reduction, oxidation, and half-wave potentials of the electrolytes with various pH values ranging from 3 to 9 obtained in the following sequences twice: 8.94, 6.99, 4.94, and 2.99. FIG. 2D shows a calibration curve for measuring pH values of an analyte established based on the obtained redox potentials.

FIG. 3A shows Locations 1 to 4 of the transmission electron beam exposed area, represented in the scanning electron micrograph. FIG. 3B shows cyclic voltammogram of 0.01 M $H_2Q$ aqueous electrolyte under the beam-off and beam-on conditions at various dose rates. FIG. 3C shows reduction peak potentials measured at various dose rates ranging from 0.7 to 2.1 $e^-\cdot Å^{-2}\cdot s^{-1}$ at Location 1 converted to the pH value based on the calibration curve. FIG. 3D shows reduction peak potentials at the Locations 1 to 4 and their converted pH values plotted as a function of time. The inset shows an anomalous cyclic voltammogram at the high dose rate of 2.1 $e^-\cdot Å^{-2}\cdot s^{-1}$ at Location 4.

FIG. 6A shows spatial concentration profiles of various radiolytic products 0.15 s after beam exposure. Shown are temporal concentration profiles at the liquid cell boundary for various species (FIG. 6B) and for H+ and OH− at various locations (FIG. 6C). FIG. 6D shows $pK_w$ values as a function of time at various locations upon electron beam irradiation including a special case of homogeneous neutralization process. The latter simulation is separately carried out for an initial $pK_w$ of 5.4 and a pH of 2.7 without a beam exposure.

FIG. 7A shows half-wave potentials of 0.1 M potassium measured with various supporting electrolytes for Pt-QRE as a function of time after the cell assembly. In the presence of potassium ferricyanide, the Pt-QRE reference potentials are highly reproducible, and particularly stable after introducing a resting time of ca. 5 h. FIG. 7B shows half-save potentials measured vs. Pt-QRE for 0.01 M $H_2Q$ aqueous solutions, which were buffered for various pH values. The deviation from the theoretical prediction is considered to be caused by the pH dependent reference potential of the Pt-QRE, which seems to be about 23.5 mV/pH.

DETAILED DESCRIPTION

Figure 1A:
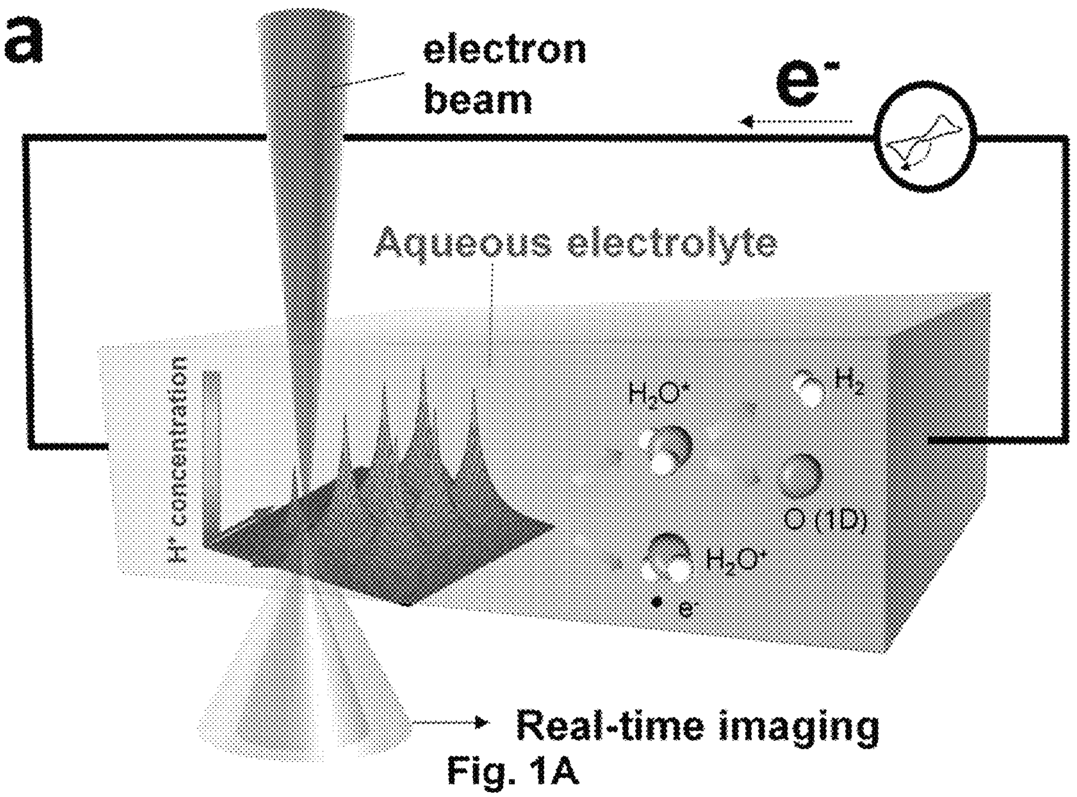
FIGS. 1A to 1D show simulation of an electron-beam induced radiolysis during water-filled in-situ TEM analysis.

According to the present invention there is provided a method, as set forth in the appended claims. Also provided is a cell and a use. Other features of the invention will be apparent from the dependent claims, and the description that follows.

Method

The first aspect provides a method of characterizing a liquid exposed to ionizing radiation, the method comprising:

including an oxidizing agent and/or a reducing agent of a redox pair in the liquid, thereby providing a corresponding redox couple;

determining a first redox potential due, at least in part, to the redox couple while exposing the liquid to the ionizing radiation.

In this way, effects of the ionizing radiation on the liquid exposed thereto may be characterized via the determined first redox potential.

For example, exposure of the liquid to the ionizing radiation may result in generation of chemical products, such as due to radiation-induced reactions in the liquid. These generated chemical products may be undesired and/or may, in turn, take part in further reactions. Hence, characterization of the liquid may include estimation of a concentration of the chemical products, using the determined first redox potential. In other words, the method according to the first aspect may be used to induce and/or follow radiation-induced reactions in the liquid.

Additionally and/or alternatively, for example, a primary purpose of exposing the liquid to the ionizing radiation may be imaging the liquid using the ionizing radiation, such as during liquid-phase electron microscopy. However, generation of chemical products may be an unintended result of the exposing the liquid to the ionizing radiation (i.e. the imaging electron beam), such that images of the liquid and/or results derived therefrom are influenced by these chemical products. For example, liquid-phase electron microscopy of corrosion may be unintentionally influenced by the imaging electron beam, such that corrosion rates are accelerated thereby. Hence, characterization of the liquid may include estimation of a concentration of the chemical products, using the determined first redox potential, and/or correction of the images of the liquid and/or the results derived therefrom. In other words, the method according to the first aspect may be used to assess whether, and optionally an extent, exposing the liquid to the ionizing radiation affects an observation and/or interpretation thereof.

Additionally and/or alternatively, for example, a radiation exposure and/or an absorbed dose of the liquid due to the ionizing may be estimated using the determined first redox potential. In this way, a flux and/or a flux density of the ionizing radiation may be calculated using the determined first redox potential. Hence, characterization of the liquid may include estimation of the radiation exposure and/or the absorbed dose of the liquid and/or the flux and/or the flux density of the ionizing radiation. In other words, the method according to the first aspect may be used to monitor ionizing radiation.

In more detail, understanding the chemical products generated in the liquid as a result of the ionizing radiation is critical for the safe operation of research and industrial facilities and devices as well as for reliable data interpretation in analytical science. Thus, predicting and measuring particular species such as $H_2$, $O_2$, $H_2O_2$, $H_3O^+$, etc. have played pivotal roles to understand the influence of ionizing radiation in water or aqueous solutions, for example. However, this aspect has not been well established in the field of recently developed analytical technologies such as in-situ synchrotron X-rays, electron microscopy, which utilize X-rays, electron or ion sources that interact with the liquid sample. For example, a feature of radiation damage that leads to severe (i.e. significant) pH change has been indirectly interpreted through changes in reaction mechanisms. However, for the latter application, there have been no reports or attempts to measure the internal pH of the liquid, due to the micro and nanoscale dimensions of the operando cell, commonly called microfluidic cell. At this scale, there are no sensors currently reported, used or commercially available to measure the pH value of the solvent as a function of irradiation time. For example, conventional methods and sensors for measurement of pH, such as colorimetrically or potentiometrically utilizing the $H^+$ ion selectivity of porous glass membrane surfaces, are not compatible with the operando cell and/or analytical technique. Furthermore, sensors based on chemiresistive techniques or using field effect transistors (e.g. OSFETs, ISFETs, ExFETs or SGFETs) also are not compatible with the operando cell and/or analytical technique.

Hence, the method according to the first aspect provides an analytical method of, for example, measuring a concentration of $H_3O^+$ which is generated as a result of exposing water-containing liquids or solvents to ionizing radiation. More specifically, by including the oxidizing agent and/or the reducing agent of the redox pair in the liquid, thereby providing the corresponding redox couple, the method according to the first aspect may be used to quantify the concentration of $H_3O^+$ or pH value, using the determined first redox potential.

Particularly, the method according to the first aspect may be used to provide quantitative information of $H_3O^+$ concentration in the liquid during material characterization in an operando setup with an ionizing radiation source, which has not thus far been possible due to the challenges of incorporating a micro-scale pH meter as a sensor. Particularly, the method developed by the inventors may be broadly applied in any solvent system (i.e. the liquid) due to the simplicity of introducing a soluble redox-active internal reference therein.

In this way, the method according to the first aspect provides an internal, direct and real-time pH measurement in a form of pH kit for operando electron, ion microscopy and operando X-ray beam line.

By way of example, the method according to the first aspect provides real-time quantitative information of $H_3O^+$ change during in-situ/operando experiment with ionizing radiation source by applying a pH-sensitive internal reference that can be introduced as an additive to the solvent (i.e. the liquid). This reference has a characteristic redox reaction, which can be identified through a specific redox potential measured with the aid of an in-situ electrochemical TEM holder. The latter is specially adapted to enable additional electrochemical measurement, for instance, in the electron microscopy setup. In more detail, the in-situ electrochemical TEM holder is generally as described in Mehdi et al. The electrochemical cell itself is located in the tip of the TEM holder with two Si microchips (a top electrochemical chip with three electrodes configuration, a spacer and 50 nm thick $Si_3N_4$ membrane and a bottom chip with a spacer and a 50 nm $Si_3N_4$ membrane) sealed within the tip by two O-rings. The microfluidic channels are integrated inside the holder to permit the circulation of the electrolyte at wide range of flow rate allowing for easy introduction of the electrolyte. The cell may be as described with respect to the second aspect. For the quantification of the pH measurement with the internal reference in the microscope, a calibration step may be performed. Since the redox potential of the internal reference is sensitive to pH value, calibration may be performed by measuring the redox potential of the internal reference in the liquid with at various pH values using a galvanostat and/or potentiostat. For example, the redox potential may be measured by applying cyclic voltammetry and tracing the current peak values/shift as a function of pH change and/or irradiation time. These measured redox potentials of the internal reference as a function of pH value provide calibration data for pH measurement during any in-situ operation with the ionizing radiation source. For measuring the actual pH value, a single cyclic voltammogram may be applied to measure the redox potential of the reference at the very moment which may be converted to pH value based on the calibration data to create liquid phase change diagram (Mehdi-Lee radiation damage diagram) and track nucleation of specific reaction products at the nano to micro scale, for example.

As described below in more detail, the inventors have obtained a calibration curve which contains the potential of redox peaks in cyclic voltammograms of solvents having pH varying in a range from pH 3 to pH 8. Based on this calibration data, the actual pH value of the solvent in an electron microscope may be obtained as a function of electron beam dose at any time by measuring a redox potential of the internal reference couple.

As described below in more detail, the inventors have validated the method according to the first aspect, including obtaining validation data that is clearly identified through redox peaks of the solvents at various pH values; most importantly, a clear correlation with the redox peaks and pH values is evident. Further experiments are planned to support the reproducibility and the reliability of the method according to the first aspect.

Characterizing

The method is of characterizing the liquid exposed to the ionizing radiation.

In one example, characterizing the liquid comprises and/or is estimating a radiation exposure and/or an absorbed dose of the liquid and/or a flux, a flux density and/or an exposure rate constant of the ionizing radiation, as described above. Generally, radiation exposure is a measure of the ionization of a medium (i.e. the liquid) due to ionizing radiation and may be defined as the electric charge freed by such radiation in a specified volume of the medium divided by the mass of that medium. Absorbed dose takes into account the absorption characteristic of the medium and has superseded radiation damage exposure. Radiation exposure and absorbed dose may be interconverted.

In one example, characterizing the liquid comprises and/or is estimating a concentration of chemical products generated in the liquid upon exposing the liquid to the ionizing radiation, using the determined first redox potential, as described above.

In one example, characterizing the liquid comprises and/or performing an analytical technique using the ionizing radiation, for example in-situ synchrotron X-ray and electron microscopy, and interpreting a result of the analytical technique based, at least in part, on the determined first redox potential, as described above. For example, interpreting the result may include estimating a concentration of chemical products generated in the liquid upon exposing the liquid to the ionizing radiation, using the determined first redox potential, and/or correction of images of the liquid and/or results derived therefrom. It should be understood that the analytical technique is performed, using the ionizing radiation, on the liquid, a component thereof and/or on a solid therein, for example an emulsion or a suspension. Additionally and/or alternatively, the analytical technique may be performed, using the ionizing radiation, on a solid in contact with the liquid.

Liquid

The method is of characterizing the liquid exposed to the ionizing radiation. Exposing liquids to ionizing radiation may cause radiolysis, thereby altering the chemical composition of the liquids, primarily via formation of free radicals, as described previously. In one example, the liquid comprises and/or is an aqueous solution (i.e. includes and/or is water). Water exposed to ionizing radiation forms free radicals of hydrogen and hydroxyl, which can recombine to form gaseous hydrogen, oxygen, hydrogen peroxide, hydroxyl radicals and peroxide radicals, and/or result in formation of hydronium ions. Formation of free oxygen promotes corrosion, for example. The presence of reactive oxygen species (for example hydroxyl radicals and peroxide radicals) has a strongly disruptive effect on dissolved organic chemicals. The concentration of hydronium ions determines, at least in part, the pH of the liquid.

Ionizing Radiation

The method is of characterizing the liquid exposed to the ionizing radiation.

In one example, the ionizing radiation comprises and/or is: electrons; ions; α, β and/or γ radiation; X-rays. In one example, the ionizing radiation is provided by a source included in an analytical instrument, for example a cyclotron or synchrotron X-ray radiation source or an electron microscopy electron source. Other sources of ionizing radiation are known.

In one example, a dose rate of the ionizing radiation is in a range from $10^{-10}$ $e^-{\cdot}Å^{-2}{\cdot}s^{-1}$ to $10^{2}$ $e^-{\cdot}Å^{-2}{\cdot}s^{-1}$, preferably in a range from $10^{-9}$ $e^-{\cdot}Å^{-2}{\cdot}s^{-1}$ to $10^{1}$ $e^-{\cdot}Å^{-2}{\cdot}s^{-1}$, more preferably in a range from $10^{-8}$ $e^-{\cdot}Å^{-2}{\cdot}s^{-1}$ to $10^{0}$ $e^-{\cdot}Å^{-2}{\cdot}s^{-1}$.

Redox Couple

The method comprises including the oxidizing agent and/or the reducing agent of the redox pair in the liquid, thereby providing the corresponding redox couple. Generally, in a redox reaction, the reducing agent (also known as reductant) transfers electrons to the oxidizing agent (also known as oxidant). Generally, the pair of an oxidizing agent and a reducing agent involved in a particular redox reaction is called a redox pair. Generally, a redox couple is a reducing species and its corresponding oxidizing form.

In one example, the redox couple includes $H^+$. Particularly, the method according to the first aspect may be applied to any redox couple that includes $H^+$ as a major reaction species.

In one example, the redox pair comprises and/or is quinone/hydroquinone or an iron-sulfur protein, ISP, for example a Rieske iron-sulfur protein. That is, the redox pair comprises pH-dependent species, the behaviour of which is well established. See, for example, Krishtalik.

The quinone/hydroquinone redox pair (also known as Q/HQ and vice versa) is well understood. A quinhydrone electrode may be used to measure the hydrogen ion concentration (pH) of a solution containing an acidic substance. Typically, a platinum wire electrode is immersed in a saturated aqueous solution of quinhydrone, in which there is the following equilibrium:

$$C_6H_6O_2 \rightleftharpoons C_6H_4O_2 + 2H^+ 2e^-$$

The potential difference between the platinum electrode and a reference electrode is dependent on the activity $a_{H^+}$ of hydrogen ions in the solution, as described below in more detail.

The iron-sulfur protein, ISP, for example a Rieske iron-sulfur protein may be as described by Ugulava and Crofts.

Redox Potential

The method comprises determining the first redox potential due, at least in part, to the redox couple while exposing the liquid to the ionizing radiation. As described previously, the ionizing radiation may induce, for example unintentionally, incidentally and/or unavoidably or alternatively, intentionally and/or deliberately, a reaction therein. By determining the first redox potential, an extent and/or type of the reaction may be inferred. That is, the determined first redox potential may be used to provide quantitative and/or qualitative information relating to exposing the liquid to the ionizing radiation.

It should be understood that the first redox potential is determined, for example by measurement, while exposing the liquid to the ionizing radiation i.e. simultaneously therewith. As described below, changes in the first redox potential may be transient and/or a function of exposure time. Hence, the first redox potential is determined in situ, in operando, in real time, online with the exposing the liquid to the ionizing radiation. In this way, an effect, for example an instantaneous effect, due to the ionizing radiation on the liquid may be determined.

In one example, determining the first redox potential is by potentiometry or voltammetry, preferably polarography or cyclic voltammetry. Such electrical techniques are known.

In one example, exposing the liquid to the ionizing radiation comprises imaging the liquid using the ionizing radiation. That is, the ionizing radiation is used to image (more generally, analytical characterise) the liquid and the ionizing radiation induces, for example unintentionally, incidentally and/or unavoidably, a reaction therein. By determining the first redox potential, an extent and/or type of the reaction may be inferred. That is, the determined first redox potential may be used to provide quantitative and/or qualitative information relating to exposing the liquid to the ionizing radiation and thereby enable correct interpretation of the analytical characterisation, for example the imaging, of the liquid.

In one example, imaging the liquid comprises electron microscopy (i.e. liquid phase electron microscopy), for example transmission electron microscopy, TEM, such as liquid-phase TEM. Generally, liquid-phase electron microscopy (LP-EM) refers to a class of methods for imaging specimens in liquid with nanometer spatial resolution using EM. LP-EM overcomes a key limitation of electron microscopy: since the electron optics requires a high vacuum, the sample must be stable in a vacuum environment. However, the properties of samples relevant to biology, materials science, chemistry, geology and physics, may change when placed in a vacuum. There are two basic approaches for imaging liquid samples: closed systems, mostly referred to as liquid cell EM (LC EM) Liquid Phase TEM (LPTEM);

and open systems, often referred to as environmental systems. In closed systems, thin windows made of materials such as silicon nitride or graphene are used to enclose a liquid for placement in the microscope vacuum. Closed cells have found widespread use in the past decade due to the availability of reliable window microfabrication technology while graphene provides the thinnest possible window. LP-EM systems of both open and closed type have been developed for transmission electron microscopy (TEM), scanning transmission electron microscopy (STEM) and scanning electron microscope (SEM). Instruments integrating liquid-phase SEM with light microscopy have also been developed while electron microscopic observation in liquid has been combined with other analytical methods such as electrochemical measurement and energy-dispersive X-ray spectroscopy (EDX)

The benefit of LP EM is the ability to study samples that do not withstand a vacuum or to study materials properties and reactions requiring liquid conditions. Examples of measurements enabled by this technique are the growth of metallic nanoparticles or structures in liquid, materials changes during the cycling of batteries, electrochemical processes such as metal deposition, dynamics of thin water films and diffusion processes, biomineralization processes, protein dynamics and structure, single-molecule localization of membrane proteins in mammalian cells and the influence of drugs on receptors in cancer cells.

However, while Schneider et al recognised that the interaction of the electron beam with the sample affects the LP EM, since the electron beam initiates a complex sequence of radiolytic reactions in water, this problem has not been previously solved. Particularly, the method according to the first aspect provides a solution, yielding qualitative and/or quantitative information relating to such radiolytic reactions during LP EM.

In one example, the method comprises determining the first redox potential repeatedly, for example intermittently, periodically and/or continuously. In this way, effects of exposing the liquid to the ionizing radiation over time may be monitored. For example, the first redox potential may be monitored as a function of time.

In one example, the method comprises determining a second redox potential due, at least in part, to the redox couple in the absence of the ionizing radiation and comparing the second redox potential and the first redox potential. In this way, a transient response of the liquid to the ionizing radiation may be observed. For example, the ionizing radiation may induce transient such as reversible or permanent effects.

pH

In one example, the method comprises calculating a pH of the liquid using the determined first redox potential, for example as described below in more detail. In this way, the pH of the liquid and/or changes thereto while exposing the liquid to the ionizing radiation may be calculated.

In one example, the method comprises calibrating the pH, for example by determining the first redox potential for a plurality of buffered solutions, for different pH values, exposed in turn to the ionizing radiation. In this way, the pH of the liquid may be calculated quantitatively.

In one example, the calculated pH of the liquid is in a range from 2 to 10, preferably in a range from 3 to 9.

In one example, a difference in calculated pH of the liquid between when exposing the liquid to the ionizing radiation and when not exposing the liquid to the ionizing radiation is in a range from 0.01 to 3, preferably in a range from 0.1 to 2.5, more preferably in a range from 0.2 to 2.

Including the Oxidizing Agent and/or the Reducing Agent

In one example, including the oxidizing agent and/or the reducing agent of the redox pair in the liquid comprises applying the oxidizing agent and/or the reducing agent of the redox pair to a solid and contacting the liquid and the solid, for example in situ. In this way, the oxidizing agent and/or the reducing agent may be included in the liquid indirectly, such as by a coating on a LP EM cell. In one example, applying the oxidizing agent and/or the reducing agent of the redox pair to the solid comprises applying a coating and/or functionalizing a surface of a holder of the liquid, for example a LP EM cell. For example, carbon functional surfaces may be grafted by quinone chemistry, for example as described by Frackowiak et al and Le Comte et al.

Supporting Electrolyte, Concentration of Oxidizing Agent and/or the Reducing Agent Generally, to minimise the effects of migration, it is preferable that a concentration of the redox species is as low as possible and the liquid should preferably include a supporting electrolyte e.g. KCl. Other supporting electrolytes are known.

In one example, the method comprises including a supporting electrolyte (also known as a swamping electrolyte) in the liquid, for example to increase conductivity thereof and/or reduce effects of migration. Supporting electrolytes are typically ionic salts, such as KCl. The latter is often chosen as they also minimise the liquid junction potential.

In one example, a concentration of the oxidizing agent and/or the reducing agent in the liquid is in a range from 0.1 mM to 10 mM. For a charge balance point of view, introducing a high concentration of HQ can cause the charge unbalanced between the working and counter electrodes. Hence, the concentration of the HQ should be minimised, particularly for the case where the electrolyte volume is limited where no conventional large batch of an electrolyte can be applied. However, if the concentration of the redox species is too low, no signal may be detected. So, depending on the size of the electrode, the generally applied concentration of redox species is on the mM scale.

TEM Cell

A second aspect provides a liquid-phase TEM cell, more generally a LP EM cell, comprising an oxidizing agent and/or a reducing agent of a redox pair for contacting with a liquid receivable therein.

The cell, the oxidizing agent, the reducing agent, the redox pair and/or the liquid may be as described with respect to the first aspect.

In one example, the liquid-phase TEM cell comprises a first chip (or wafer) having two or three electrodes, a second chip and a volume therebetween for receiving a liquid. In one example, the first chip and/or the second chip are formed of silicon, silicon carbide, silicon nitride and/or graphene. Other suitable materials are known. In one example, the first chip and/or the second chip are provided with a membrane e.g. nm $Si_3N_4$ membrane. In one example, the cell comprises one or more spacers, to mutually space apart the first chip and the second chip. In one example, the cell comprises one or more seals e.g. O-rings, to seal the cell. In one example, the cell comprises an inlet and/or an outlet, for example provided as microfluidic channels, to provide a liquid into the cell therethrough and/or recirculate the liquid.

Use

A third aspect provides use of quinone/hydroquinone for in situ pH calculation of a liquid during liquid-phase TEM thereof.

Definitions

Throughout this specification, the term "comprising" or "comprises" means including the component(s) specified but not to the exclusion of the presence of other components. The term "consisting essentially of" or "consists essentially of" means including the components specified but excluding other components except for materials present as impurities, unavoidable materials present as a result of processes used to provide the components, and components added for a purpose other than achieving the technical effect of the invention, such as colourants, and the like.

The term "consisting of" or "consists of" means including the components specified but excluding other components.

Whenever appropriate, depending upon the context, the use of the term "comprises" or "comprising" may also be taken to include the meaning "consists essentially of" or "consisting essentially of", and also may also be taken to include the meaning "consists of" or "consisting of".

The optional features set out herein may be used either individually or in combination with each other where appropriate and particularly in the combinations as set out in the accompanying claims. The optional features for each aspect or exemplary embodiment of the invention, as set out herein are also applicable to all other aspects or exemplary embodiments of the invention, where appropriate. In other words, the skilled person reading this specification should consider the optional features for each aspect or exemplary embodiment of the invention as interchangeable and combinable between different aspects and exemplary embodiments.

Figure 1B:
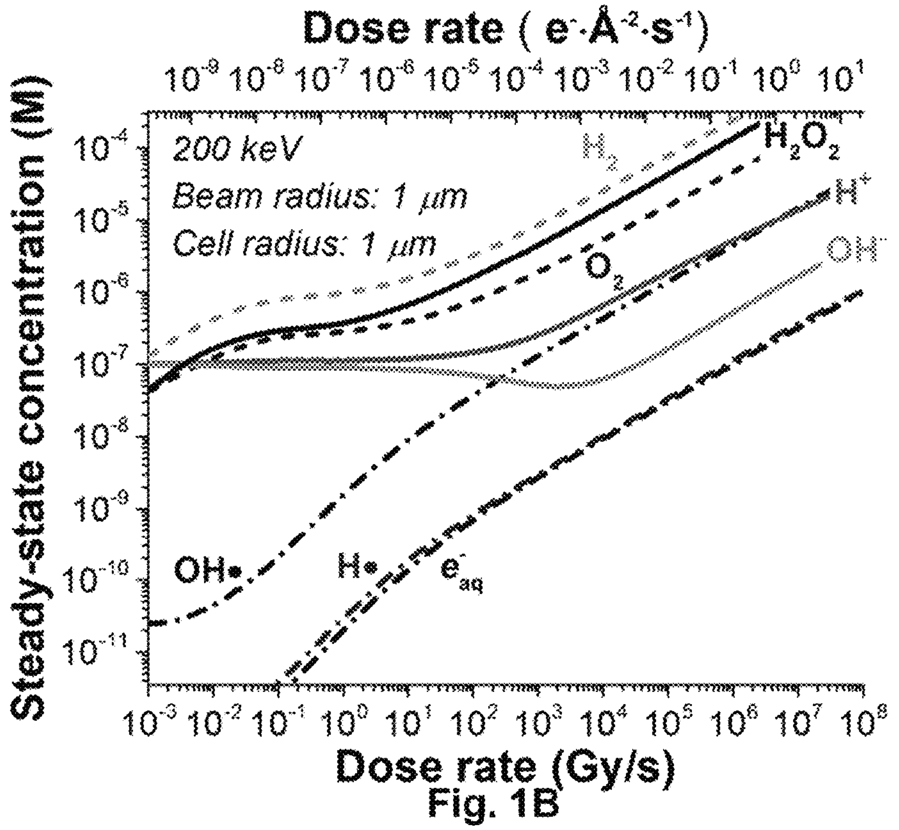

Upon beam exposure to an aqueous solution in an in-situ STEM cell, a radiolysis process occurs as the high energy of the electrons leads to excitations and ionisation of the water molecules. According to a radiolysis simulation carried out for homogeneous conditions (i.e. all liquid in the system is exposed to a homogeneous beam), the radiolytic products depend strongly on the applied beam dose, and each species exhibit different behaviour (FIG. 1B). This variation arises due to the difference in G-values and the series of chemical reactions with different kinetics. While the simulation under the homogeneous condition is useful for the liquid systems on the nanometre scale such as graphene liquid cells, in the case when the beam size is smaller than the size of the liquid, a heterogeneous condition should be applied by incorporating the concept of the diffusion of the chemical species. Considering the growing applications of in-situ TEM analysis with large liquid volumes and the strategic importance of applying STEM analysis, we will now focus on a more specific radiolysis simulation based on the reaction-diffusion model for a simplified STEM condition. For the latter condition, various radiolysis processes are simulated for an electron beam at a fixed position with a radius of 0.5 nm at an acceleration voltage of 200 keV in deaerated neutral water confined in a cylindrical liquid volume with the radius of 200 μm.

Figure 6A:
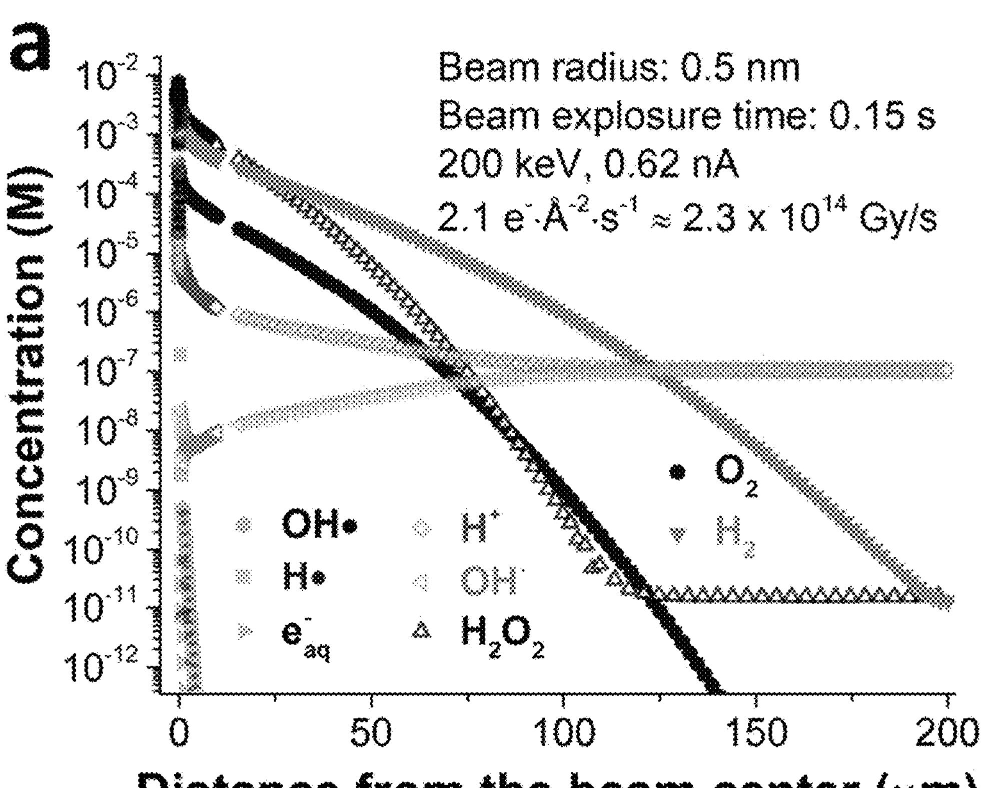
FIGS. 6A to 6D show simulations for beam-induced radiolysis process in a water-filled cylindrical cell having a radius of 200 μm for an electron beam having a radius of 0.5 nm at $e^-\cdot Å^{-2}\cdot s^{-1}$.
Figure 6B:
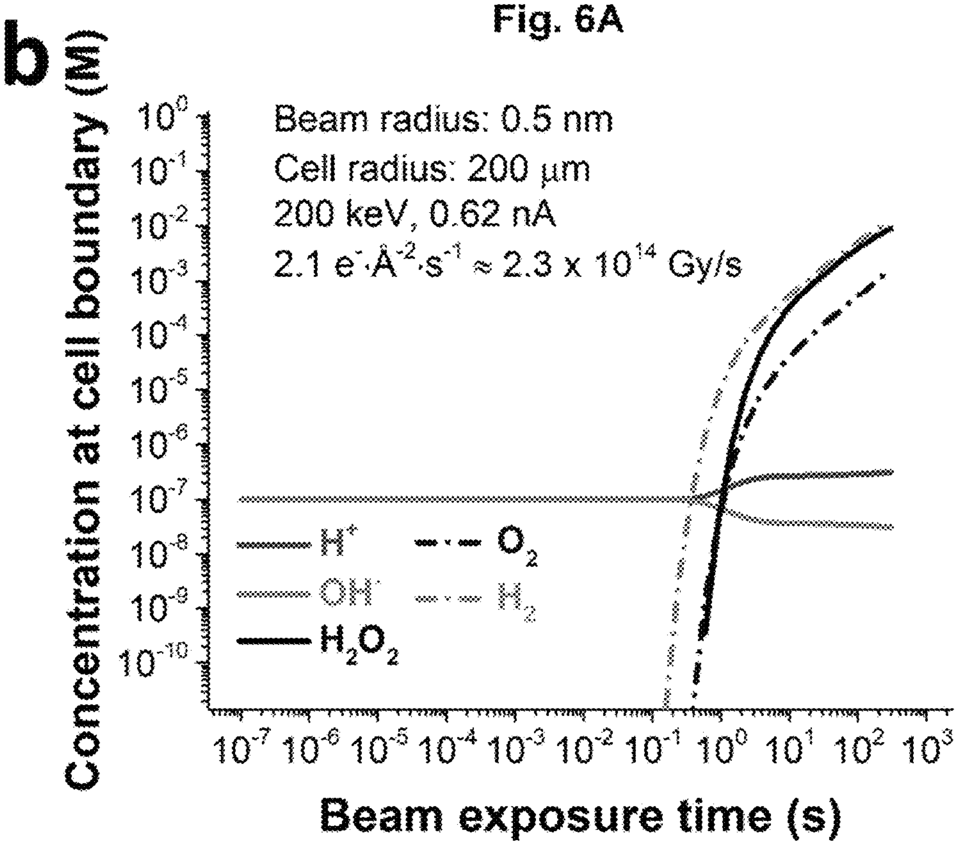

Based on the simulation at a dose rate of 0.7 $e^{-}\cdot Å^{-2}\cdot s^{-1}$, which is equivalent to $2.3\times10^{14}$ Gr/s, the concentration of radiolytic species on the beam exposed area changes as a function of the irradiation time (FIG. 1C) and also as a function of the distance from the beam centre (FIGS. 6A to 6B). Since the primary interest of our study is the electron beam-induced H+ ions in water, we will now further focus on the concentration of $H^+$ and $OH^-$ ions (FIG. 1D): the $OH^-$ is also chosen for its close relation to $H^+$ through the neutralisation reaction. First, the spatial dependency on the concentration of $H^+$ and $OH^-$ ions can be clearly seen as represented by the values obtained at the beam centre and the cell boundary; the latter is 200 μm away from the beam centre.

Interestingly, the concentrations of both $H^+$ and $OH^-$ in the beam-exposed area increase sharply upon irradiation and stay almost constant at a high value around $10^{-3}$ M. At the cell boundary, the concentration of $OH^-$ shows a decreasing tendency during the electron radiation while $H^+$ shows an opposite trend. The difference observations in behaviour the beam centre and the cell boundary is the consequence of a diffusion, mutual interactions of the chemical species, different kinetics, and G-values through the time and space. However, the primary origin can be understood by the fact that the concentration of the $H^+$ and $OH^-$ is mostly governed by the early-stage radiation yield at the beam centre. While these species are diffusing farther through space, further reactions such as neutralisation take place, leading to different temporal concentration profiles at different positions (see FIG. 6C).

Figures 1C, 1D:
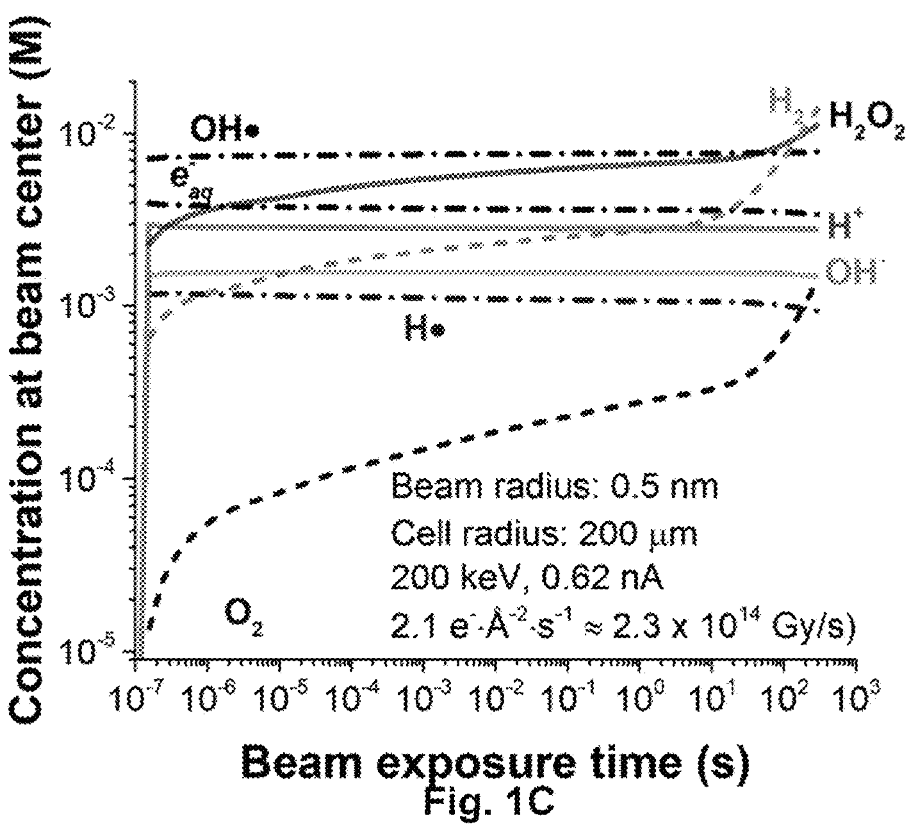

When the beam is turned off, the concentrations of $H^+$ and $OH^-$ ions return back to the initial concentration of $10^{-7}$ M regardless of the position as characterised by almost identical temporal concentration profiles (FIG. 1D). Notably, the high $OH^-$ concentration at the beam centre drops immediately as soon as the irradiation is stopped. While several studies have been reported regarding the radiolysis simulation, this particular aspect of relaxation process after the beam irradiation has not been previously established to the best of our knowledge.

Figures 6C, 6D:
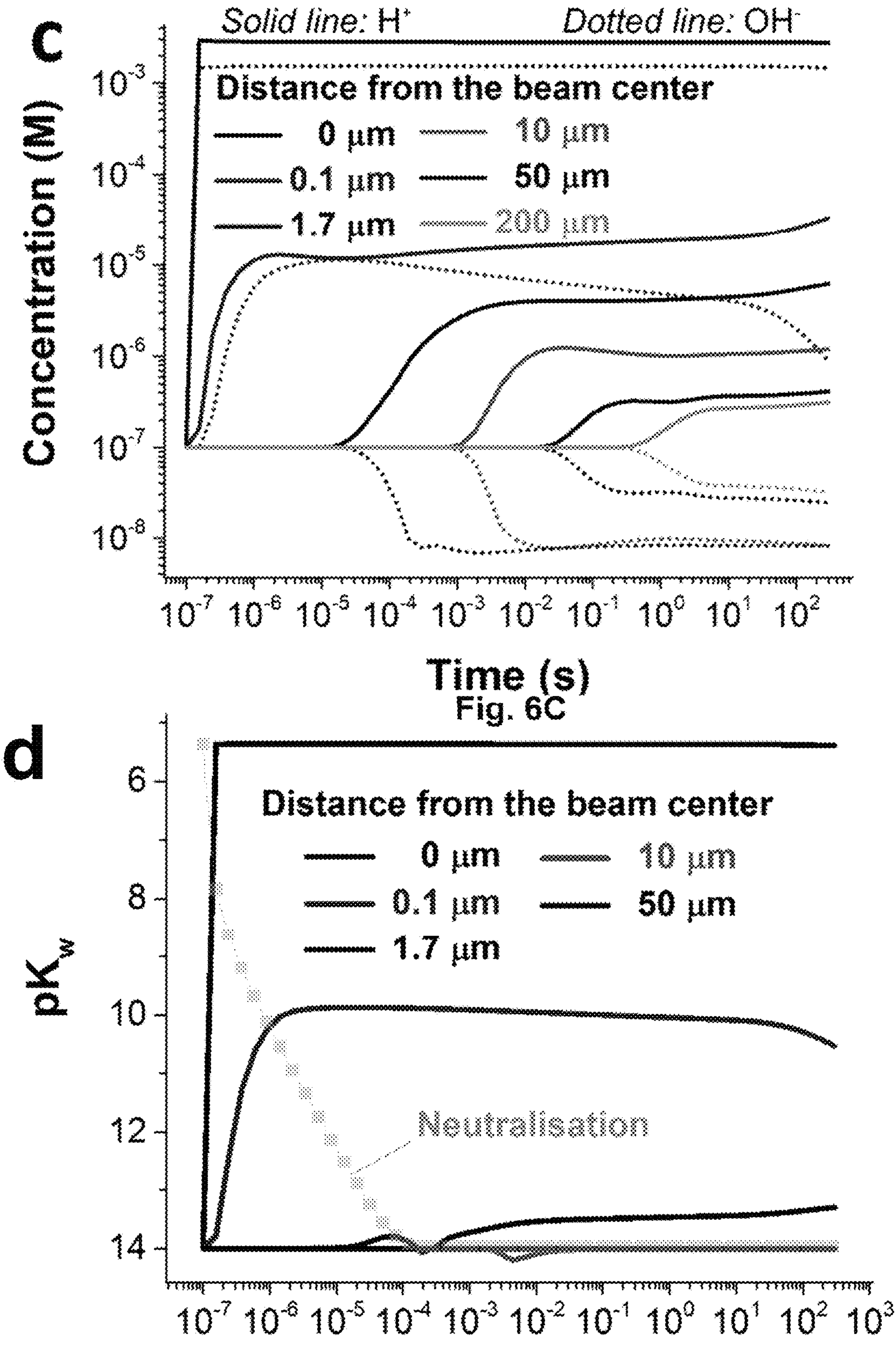

In the case of dilute water in equilibrium, the pH and pOH values are governed by the autoprotolysis constant, $K_w$:

$$\mathrm{pH} + pOH = pK_w \qquad \text{Equation (1)}$$

where $pK_w$ can be estimated to be close to 14 at 25° C. This relation can be well applied to the data obtained from the positions sufficiently away from the beam centre; however, discrepancies are observed near the beam exposed area (FIG. 6D). The reason for the latter is mainly due to the direct yield of $H^+$ and $OH^-$ from the beam irradiation and the finite kinetics of the reactions. For instance, the generation of $H^+$ and $OH^-$ takes place almost immediately upon the irradiation at the beam centre as indicated by a sharp increase in their concentration in FIG. 1D leading to the $pK_w$ value of 5.4 (FIG. 6D). However, compared to this rapid generation process of $H^+$ and $OH^-$ ions, their neutralisation reaction process is a lot slower (FIG. 6D); the latter process simulated separately for an initial $pK_w$ of 5.4 and a pH of 2.7 without a beam exposure. This is an interesting point regarding the chemistry of the liquid cell since the high concentration of $H^+$ ions in the beam centre may not be 100% actively involved in particular chemical reactions. Instead, a large fraction of them will undergo the neutralisation reaction, for instance, due to equally high $OH^-$ concentration. Hence, it is of high importance to investigate how the beam-induced $H^+$ ions will actually influence the chemistry of the liquid cell system. In that regard, we will apply an in-situ electrochemical STEM (ec-STEM) analysis for aqueous solutions by relying on pH-sensitive redox reaction. The latter can enable quantitative measurement of the beam-induced $H^+$ concentration as well as its activity.

Often, pH values are measured by a pH-sensitive glass electrode, which is particularly practical for measuring bulk analyte. The advanced pH meters based on a glass electrode are available for the uL-scale samples with the probe tip diameter on a micrometre scale. Nonetheless, developing an embedded pH meter for the in-situ ec-TEM holder is an extremely challenging task due to the limited space at the tip of the TEM holder as well as the restricted dimension of the currently available microchips. For instance, an ec-TEM microchip has a thickness of a few hundred micrometres with the flow channel thickness on a nanometer scale. For this reason, no measurement of pH value in the liquid-sealed in-situ TEM holder has been reported despite its importance of understanding the electron beam-induced radiolysis process. In fact, pH values can be alternatively measured by relying on the quinone/hydroquinone ($Q/H_2Q$) redox reaction:

$$Q+2H^{+}+2e^{-} \rightleftharpoons H_2Q \quad \text{Equation (2)}$$

This approach, or also known as quinhydrone electrode system, determines the pH value of an analyte relying on the pH-dependent redox potential ($\varphi_e$) at an electrode, which can be described by Nernst equation:

$$\varphi_e = \varphi_0' + 0.0592 \times \text{pH} + \frac{RT}{2F}\ln\left(\frac{[H_2Q]}{[Q]}\right) \quad \text{Equation (3)}$$

where $$\varphi_0'$$

is introduced to represent the deviation from the standard redox potential ($\varphi_0$) due to activity and diffusion coefficients, R is the gas constant ($8.3145\times10^{3}$ J·mol$^{-1}$·K$^{-1}$), T is the temperature in Kelvin, and the factor of 0.0592 is for the conversion from the original term $-RT/2F\cdot\ln([H^{+}]^{2})$. The first two terms on the right-hand side of Equation (3) can be considered as a formal potential ($\varphi_f$), which is a function of pH. Hence, by establishing the relationship between the formal potential of the $Q/H_2Q$ redox couple and the pH value of the solution, a calibration curve can be prepared, which will be used as a database to measure the pH value of an analyte.

Figures 2A, 2B:
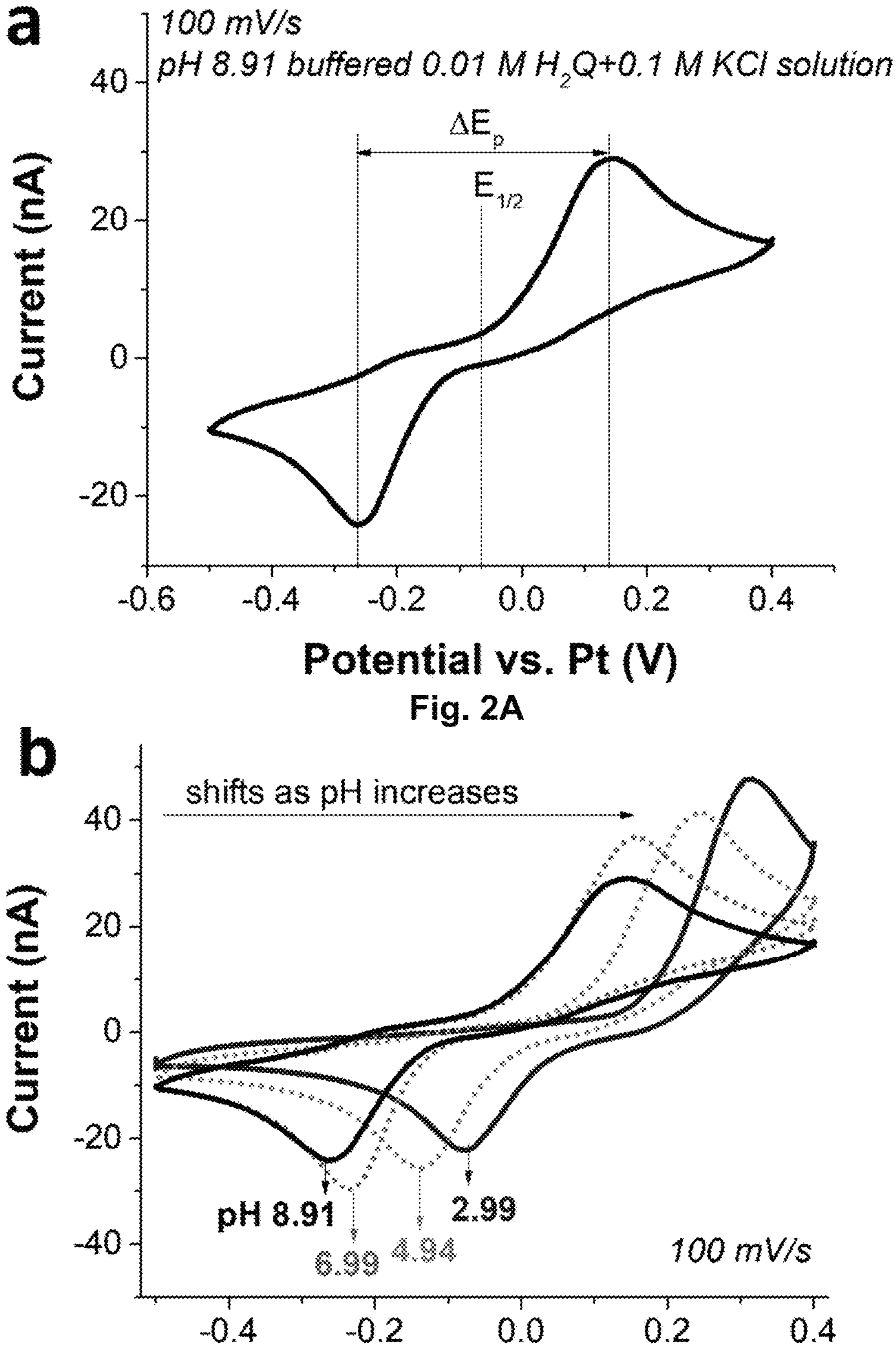
FIGS. 2A to 2D show establishment of correlation between pH of a solution and redox potentials for the quinone/hydroquinone ($H/H_2Q$) couple and validation of pH-redox potential calibration curve with Pt quasi reference electrode.

The formal potential can be practically assumed by the half-wave potential ($E_{1/2}$) between the oxidation and the reduction peak potentials in the cyclic voltammogram (FIG. 2A). For instance, the cyclic voltammogram obtained for the pH 8.91 buffered 0.01 M $H_2Q$ electrolyte at 100 mV/s shows an oxidation and a reduction peak at around 146 and −265 mV vs. Pt, respectively. Hence, the formal potential at this pH value can be assumed to be around −55.5 mV vs. Pt. These values are, however, based on the Pt quasi reference electrode (QRE), whose reliability should be thoroughly validified in terms of accuracy and stability. In the ideal case, the reference potential should be reproducible without drifting as a function of time.

Figure 7A:
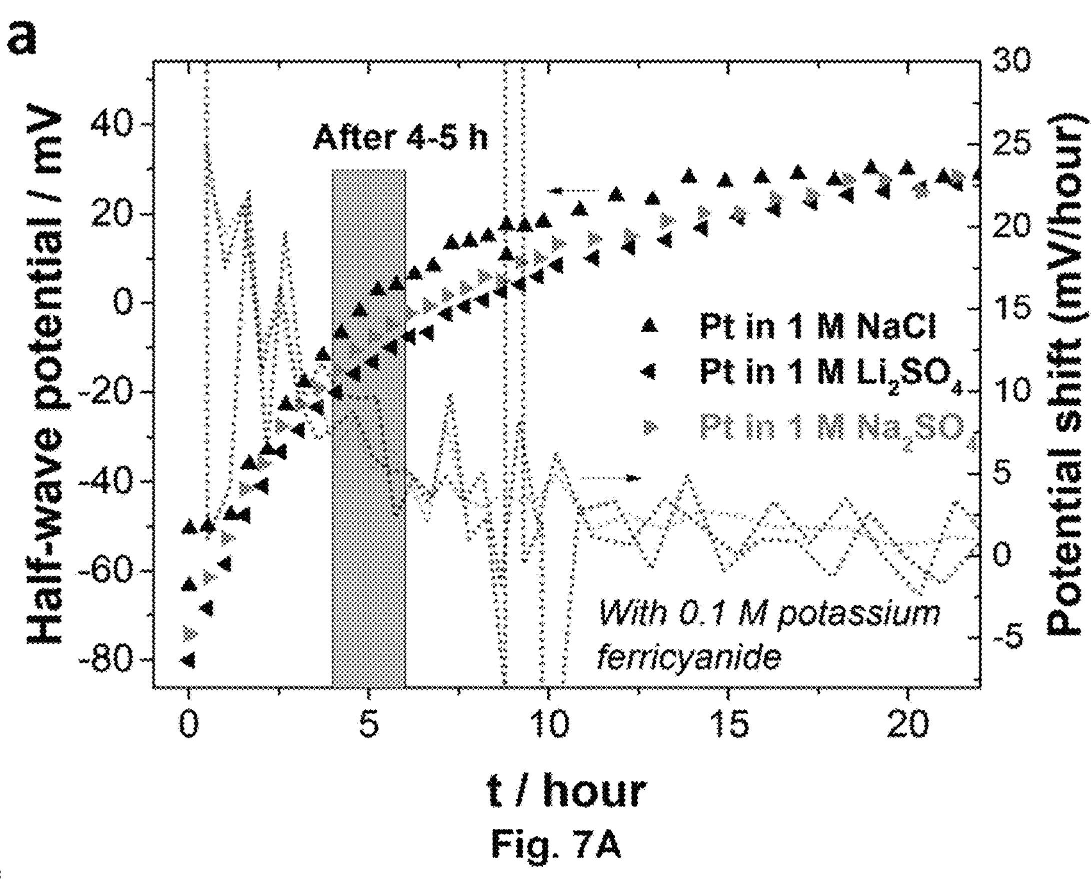
FIGS. 7A and 7B show stability and reliability of Pt quasi reference electrodes (QRE).

Pt QRE exhibits a quite reproducible reference potential in the presence of a dissolved redox couple in the electrolyte while the level of potential shift is negligible when sufficient resting time is introduced after the cell assembly, for aqueous solutions. For instance, Pt QRE showed reproducible reference potential with 5 mV accuracy in NaCl, $Li_2SO_4$, and $Na_2SO_4$ as well as a negligible potential drift of below 1 mV per hour in the presence of the ferricyanide/ferrocyanide redox couple after introducing 20 h of resting time (FIG. 7A). Even introducing a 4-5 hr resting time, the potential shift was observed to be about 5 mV/hour.

Figure 2C:
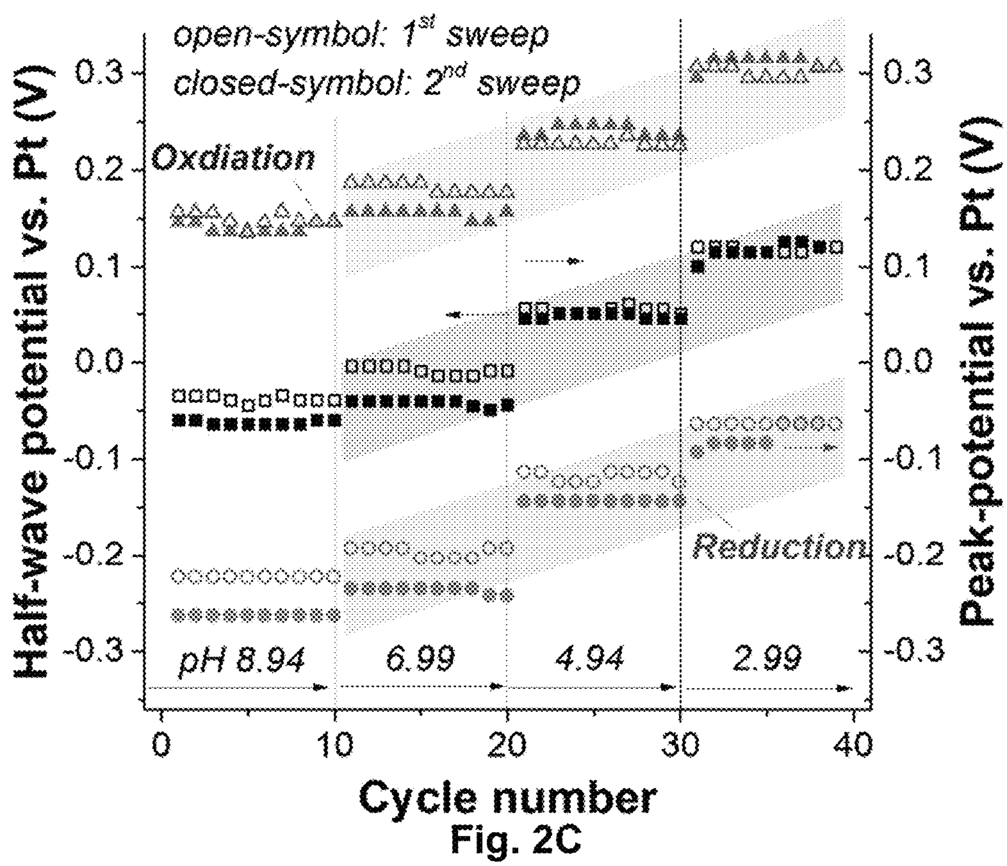

For establishing the validity of applying Pt QRE for quantifying the pH value in our study, electrolytes containing 0.01 M $H_2Q$ in various buffered aqueous solutions were further characterised by cyclic voltammetry (FIG. 2B). As expected from the Nernst equation, the formal potential of the HQ/Q couple shifts to the positive value as the pH value decreases. For a detailed quantitative validification, the electrolytes with various pH values were characterised according to the following sequence: pH 8.94, 6.99, 4.94, and 2.99 for the first sweep and the second sweep in the same order (FIG. 2C). For changing the electrolyte, a flow rate of 30 μL/min was applied for 10 minutes. After the flow was stopped, 10 minutes of a resting time was applied before obtaining 10 cyclic voltammograms. The entire experiment was carried out for about 3 hr. Based on these voltammograms, the oxidation and reduction peak potentials, as well as the half-wave potentials, are summarised in FIG. 2C. While these values exhibit a clear trend as a function of pH value, the peak separation ($\Delta E_p$) stays nearly constant, implying an insignificant change in the reaction kinetics. Hence, either of the oxidation peak, reduction peak, and the half-wave potentials can be applied for the pH measurement. For instance, the calibration curve is prepared based on the half-wave potential of the HQ/Q reaction in FIG. 2D, where error bars represent the reproducibility and the stability from the data set shown in FIG. 2C.

The trend in the calibration curve (FIG. 2D) with two different slopes is in line with the other reported work with various types of quinones. The presence of these two different slopes indicates two different charge transfer mechanisms for the pH below 7 and above. Depending on the types of the quinone and the electrodes, including the choice of the electrolyte solution, various charge mechanisms are available. In general, a two-electron transfer process for $2H^{+}$ (Equation 2) is expected for hydroquinone containing electrolytes leading to a slope of 59.2 mV/pH under pH 8; hence, HQ/Q couple has been often applied in this pH range. According to the radiolysis simulation, the pH value is expected to decrease under the influence of the electron beam. Hence, we chose the slope obtained in the pH range from 3 to 7 as calibration data for the actual pH measurements later on under the in-situ STEM experimental conditions.

Figure 7B:
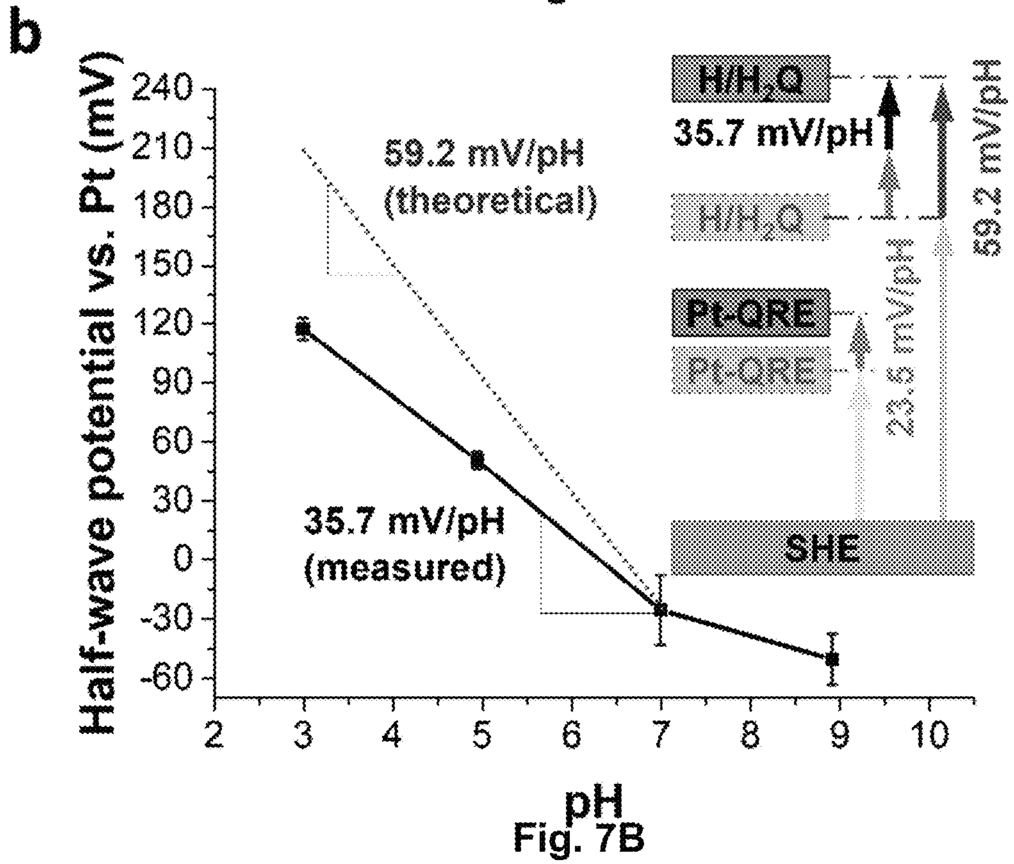

In contrast to the expected slope of 59.2 mV/pH for the reaction described in Equation 2, the obtained slope is 35.7.0 mV/pH from our experiment. One possible explanation for the latter value is a different charge transfer mechanism, for instance, via $2e^{-}/H^{+}$ instead $2e^{-}/2H^{+}$ process. However, the latter $2e^{-}/2H^{+}$ process has been widely observed from various studies for the $Q/H_2Q$ redox reactions. Hence, it is probable that the obtained slope of 35.7 mV/pH is instead caused by the pH-dependent reference potential of Pt QRE, which can be estimated to be around 23.5 mV/pH. With the contribution of the latter phenomenon, the actual slope of 59.2 mV/pH can be possibly measured to be 35.7 mV/pH (FIG. 7B). Yet, identifying the actual origin of the observed slope of 35.7 mV/pH for the redox reaction from the 0.01 M $H_2Q$ electrolytes applied in this study is clearly beyond the scope of the work. Instead, a rather important criterion for the validation of our calibration approach is the reproducible and stable correlation between the observed redox potential and the applied pH value of the electrolytes.

Figure 2D:
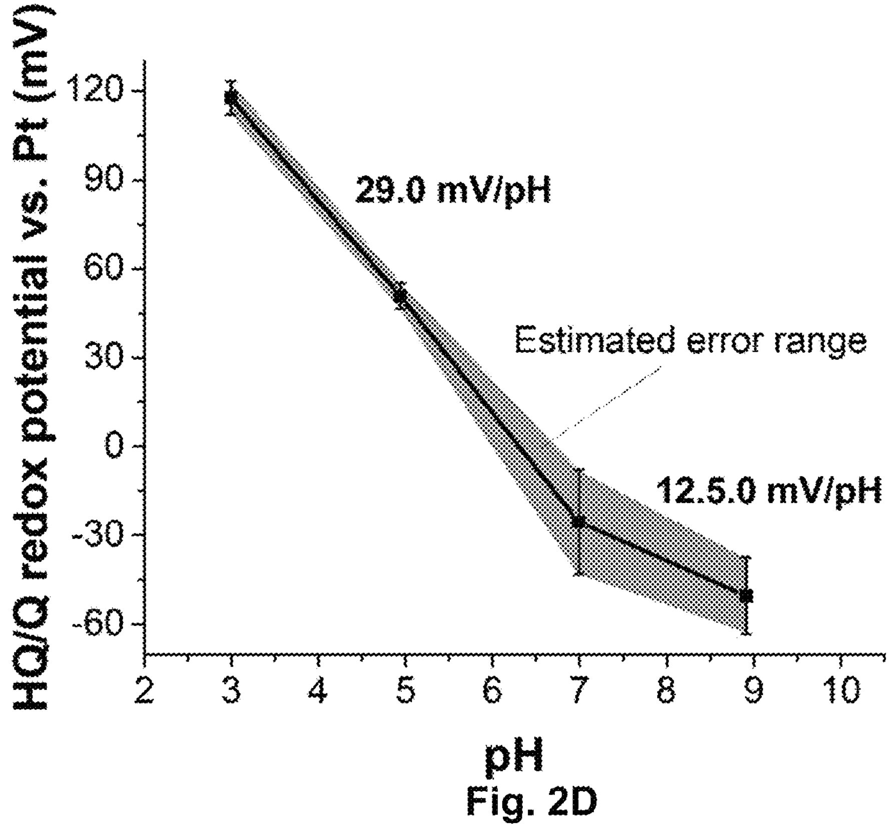

The latter aspects are represented as error bars in the calibration curve in FIG. 2D; the error bars were obtained by calculating the standard deviation from all data points (FIG. 2C) at each pH step during the 1$^{st}$ and the 2$^{nd}$ sweeping.

Figure 3A:
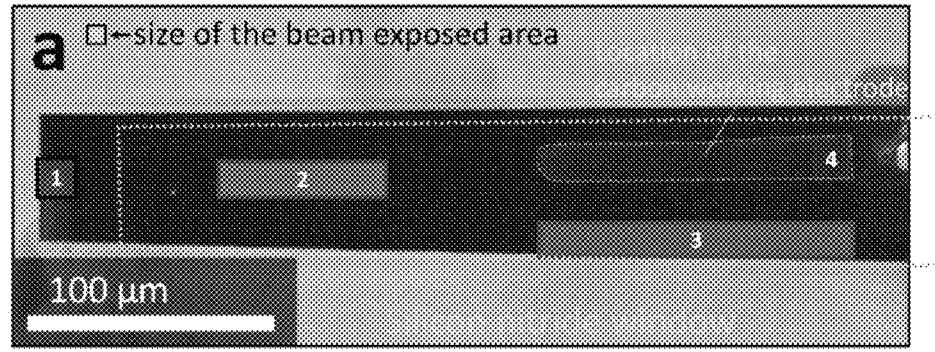
FIGS. 3A to 3D show quantitative analysis of measuring concentration and activity of $H^+$ during STEM analysis in a water-filled electrochemical cell.

For quantifying the pH change induced by the electron beam through radiolysis, we exposed the electron beam at four different positions in the in-situ liquid cell. As illustrated on the scanning electron micrograph in FIG. 3A, the beam exposed area (7.46 μm×7.46 μm, a boxed regime with black dashed lines) under scanning condition was first located at the left edge of the silicon nitrate (electron-transparent) window. In order to reflect the uncertainty of the exact location of the beam exposed area, a boxed regime with a blue colour, or Location 1, is illustrated in FIG. 3A. Afterwards, the electron beam was blanked for a beam-off condition, and the electrolyte was flushed to provide a fresh electrolyte to eliminate the influence of the radiolysis damage introduced by the earlier beam exposure during the locating phase. After introducing 15 min resting time, the cyclic voltammograms were obtained for the first 5 minutes under the beam-off condition. Then, the same area was exposed to the beam with the dose of 0.7 $e^{-}\cdot Å^{-2}\cdot s^{-1}$ for 5 min while cyclic voltammograms had been recorded continuously. Afterwards, the beam was blanked for 5 min before the next exposure with the beam dose of 1.2 $e^{-}\cdot Å^{-2}\cdot s^{-1}$. In this manner, cyclic voltammograms were obtained under the three different dose conditions: 0.7, 1.2, and 2.1 $e^{-}\cdot Å^{-2}\cdot s^{-1}$. Following the same procedures, the data had been further collected at various locations: Location 2, Location 3, and Location 4 (FIG. 3A). During the experiment, no sign of gas bubble formation was detected as evidenced by a typical liquid-filled contrast throughout.

Figure 3B:
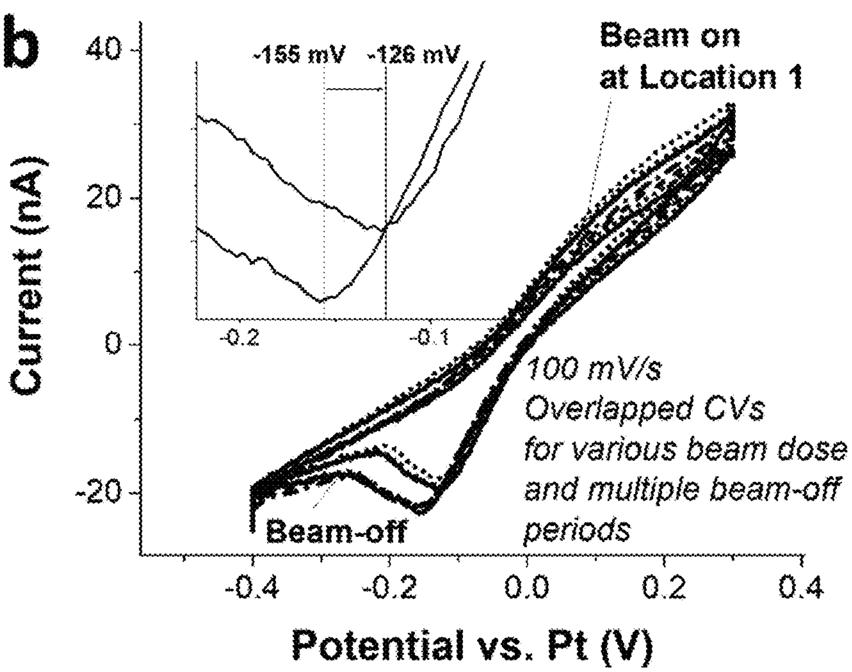
Figure 8A:
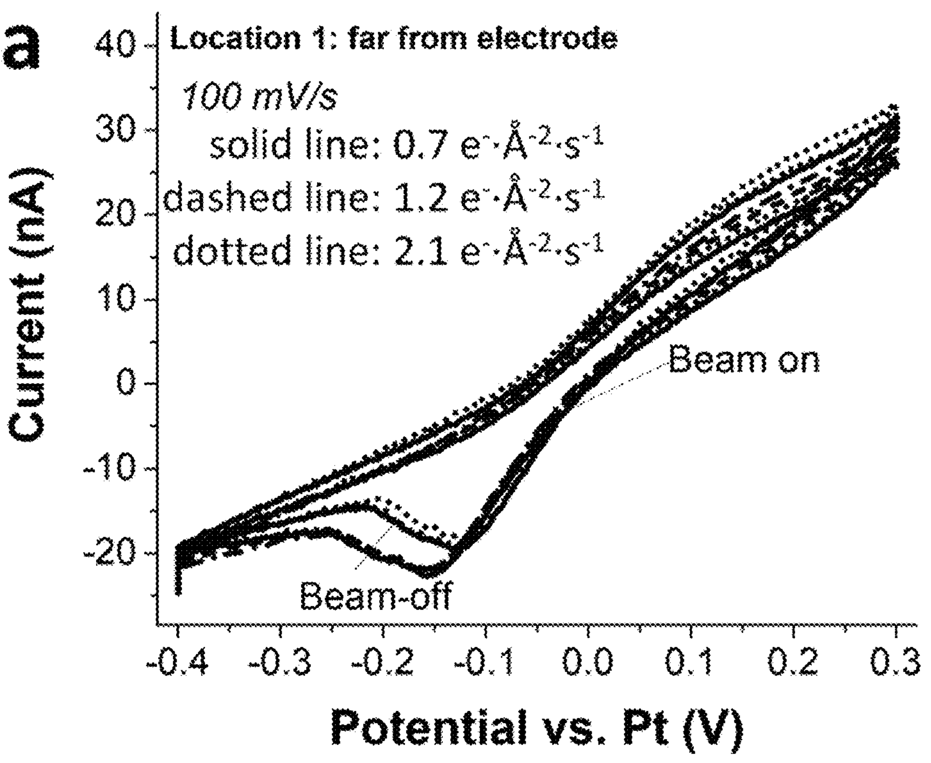
FIGS. 8A to 8D show cyclic voltammograms obtained during STEM analysis in a water-filled electrochemical cell at different beam doses for various locations.
Figure 8B:
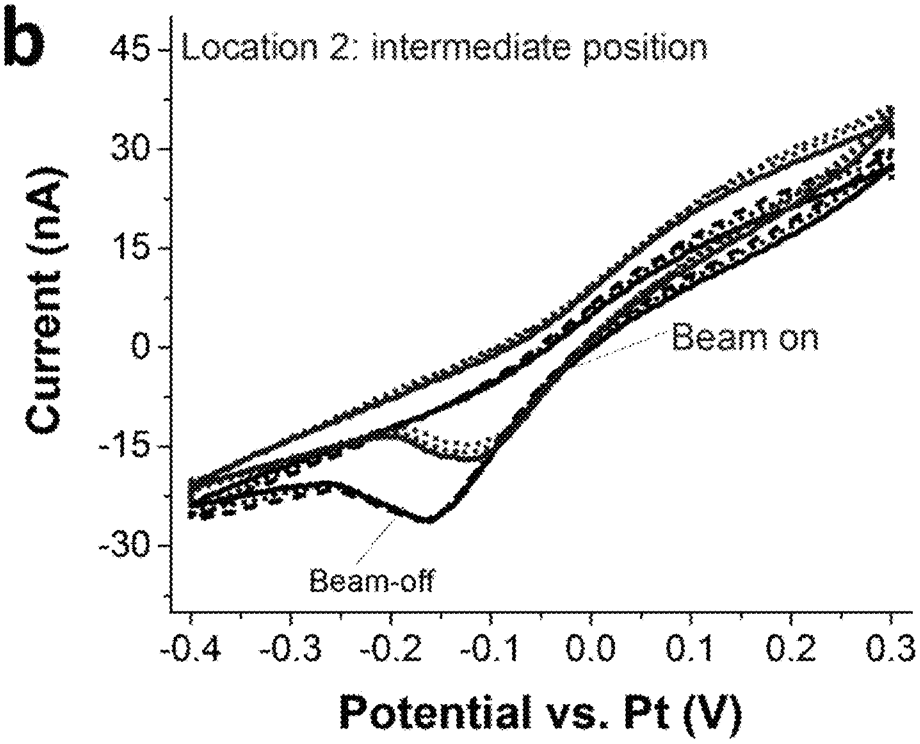
Figure 8C:
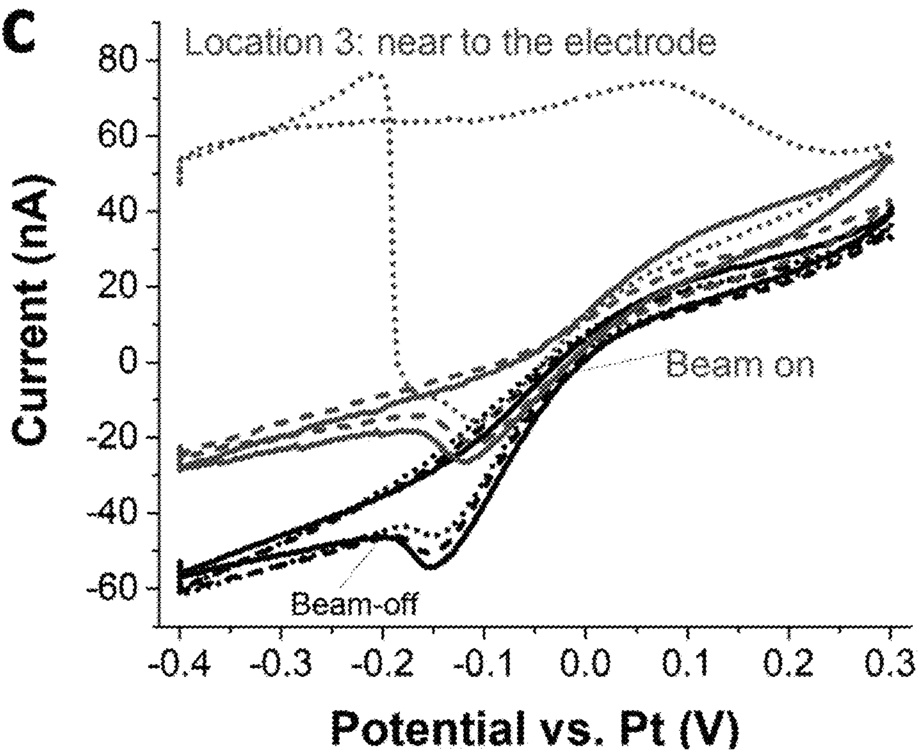
Figure 8D:
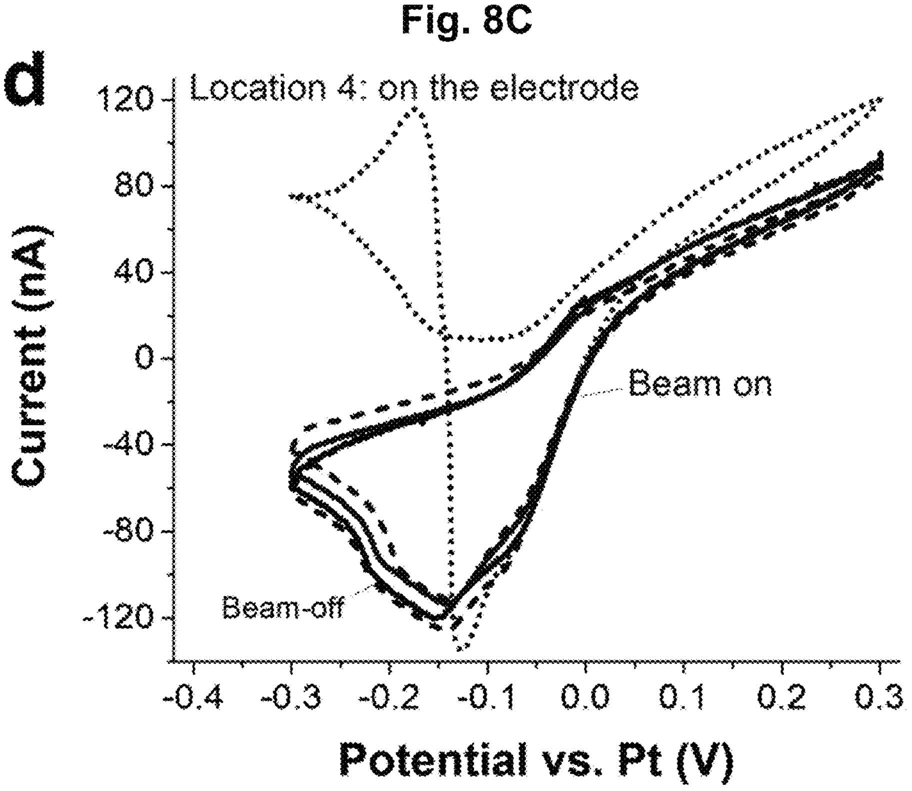
Figures 8E, 8F:
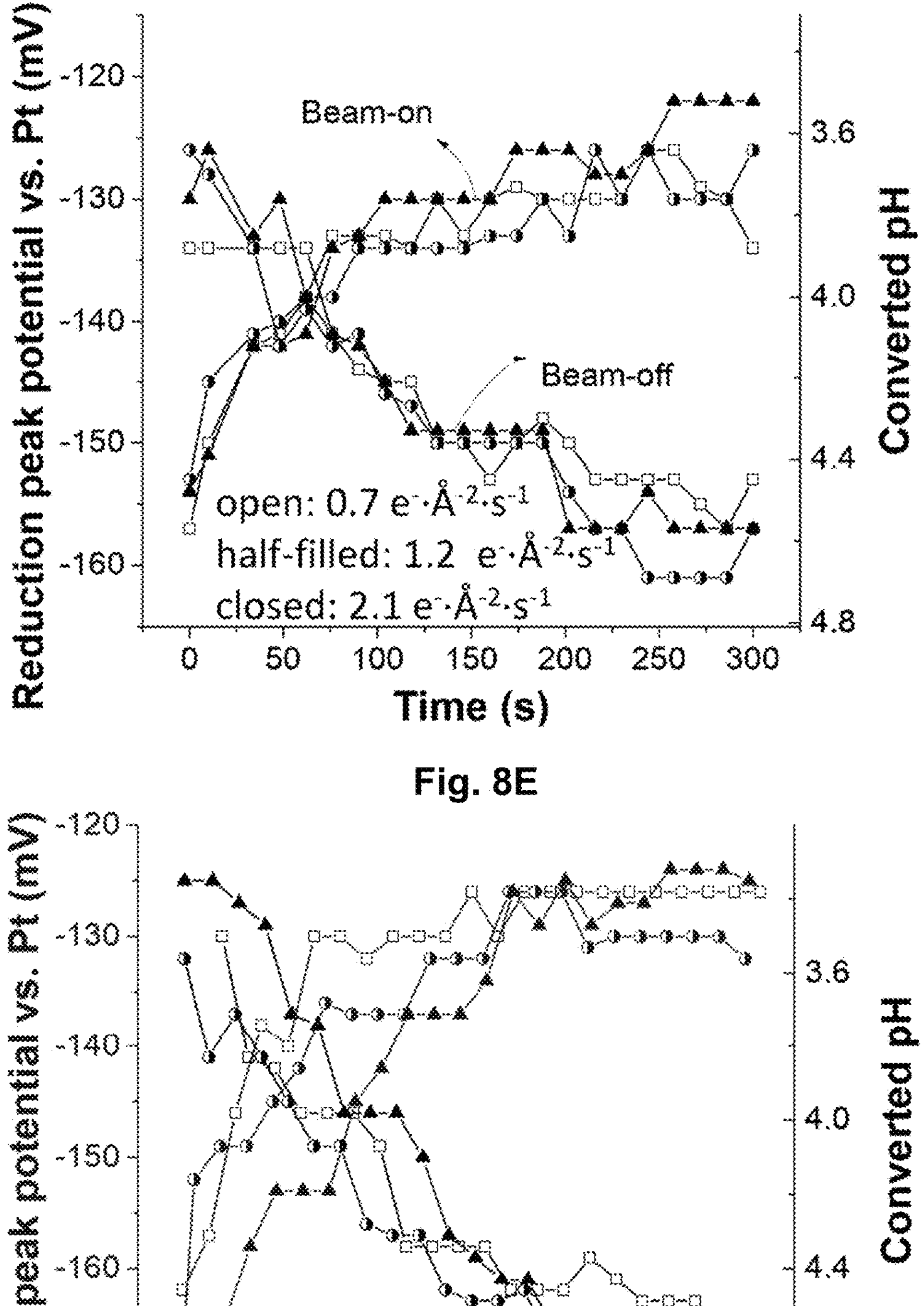
FIGS. 8E to 8H show respective reduction peak potentials plotted as a function of time and converted to pH values.
Figures 8G, 8H:
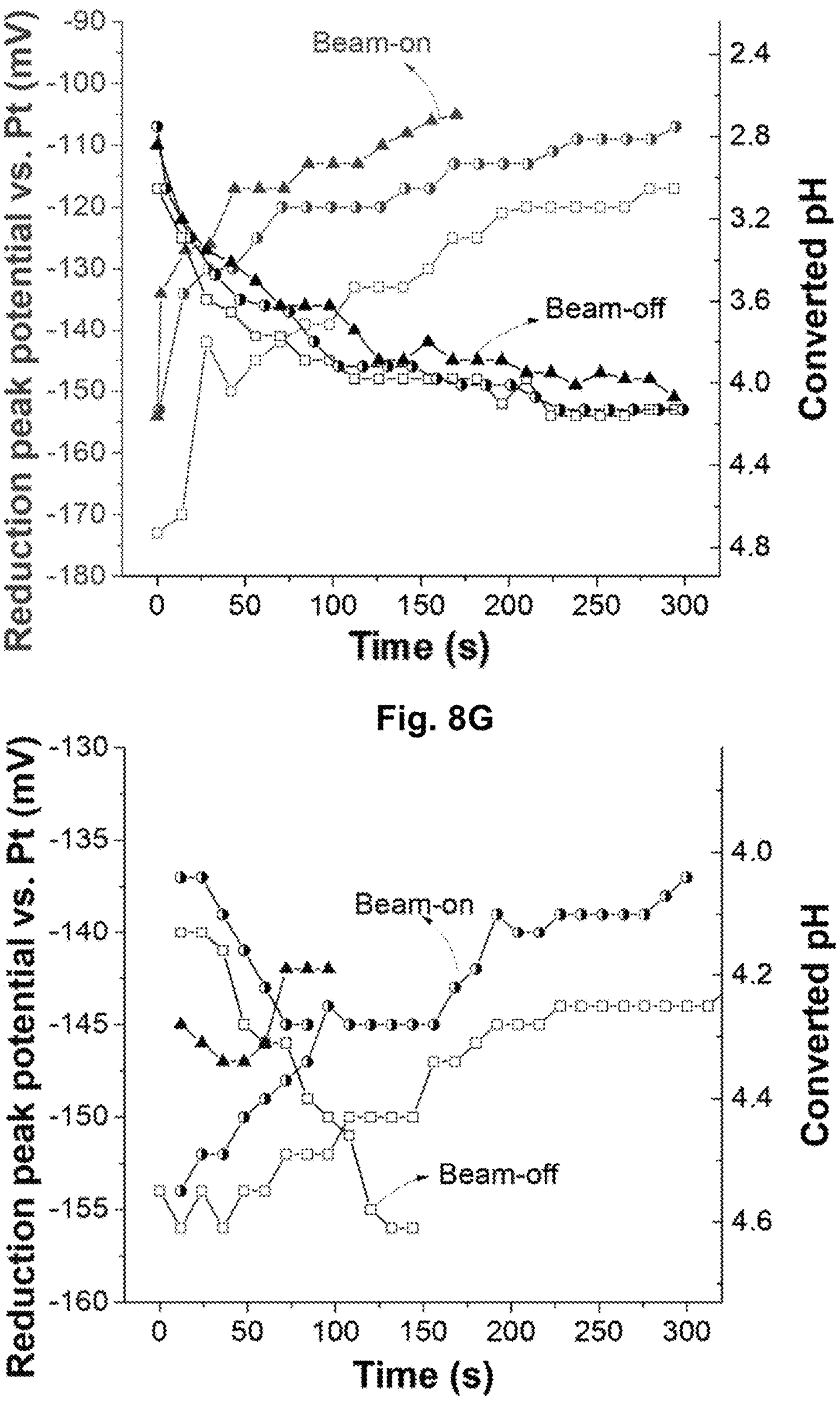
Figure 9:
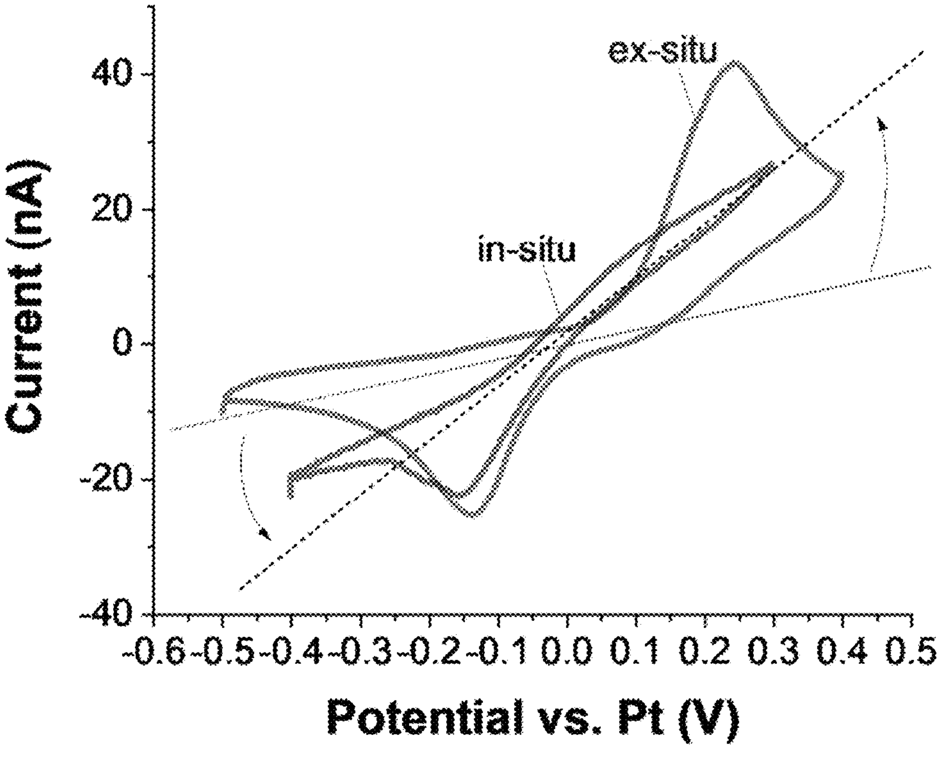
FIG. 9 shows cyclic voltammograms obtained for the in-situ and ex-situ conditions in 0.01 $H_2Q$ and 0.1 M KCl aqueous solutions. For the ex-situ experiments, the solutions were buffered for pH 4.94.

The cyclic voltammograms obtained at Location 1 is summarised in FIG. 3B: the rest of the voltammograms at Location 2, Location 3, and Location 4 are shown in FIGS. 8B to 8D. Compared to the cyclic voltammograms obtained from the ex-situ experiment, a slightly different shape of voltammogram can be seen for the data obtained during the in-situ investigation at Location 1 (FIG. 9). First, the distortion in the cyclic voltammogram obtained from the in-situ experiment indicates the possible introduction of a resistive component in the cell system. This resistive component could be caused by the bulging of the silicon window, which can lead to a loosen contact between the electronic junctions, for instance, between the Pt metal and the carbon working electrode. Furthermore, window bulging can also lead to a change in mass transport behaviour through the change in the thickness of the electrolyte above the working electrode. The difference in electrochemical signals can also be introduced due to the difference in experimental configurations between the in-situ and ex-situ experiment. Also, various configurations of the in-situ microchip and the holder design are expected to play critical roles combined with the parameters mentioned above. In fact, the difference between ex-situ and in-situ experiments have been reported for various electrochemical systems and instrumental setups.

Figure 3C:
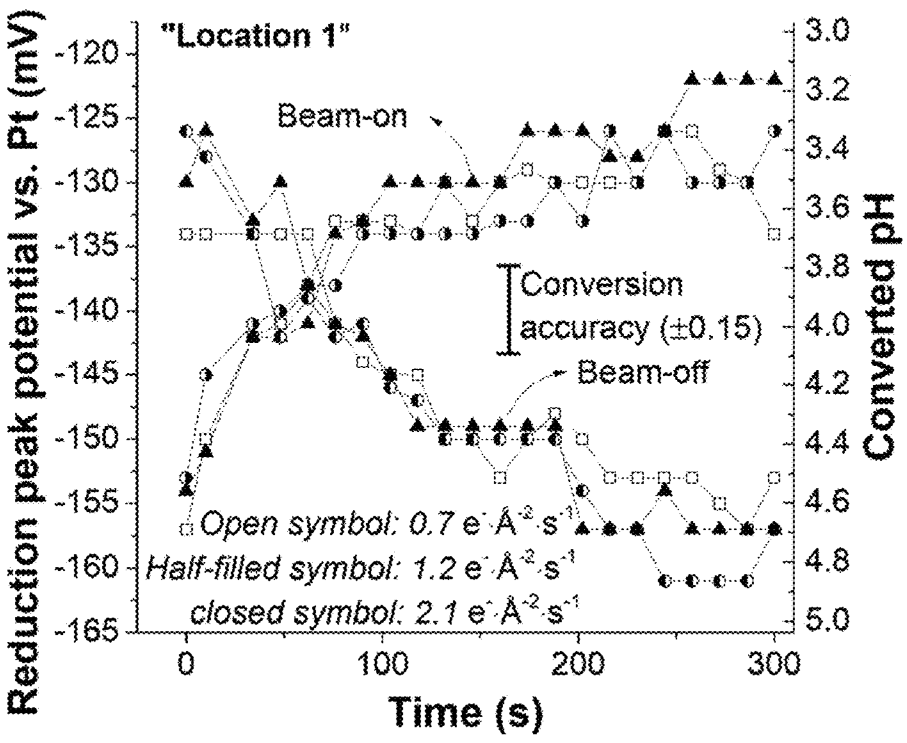

According to the calibration data shown earlier in FIG. 2C, the apparent correlation between the reduction potential and the pH value of the electrolyte enables quantifying pH of the electrolyte during the in-situ experiment. At Location 1, the reduction peak potential was measured to be −155 mV vs. Pt under the beam-off condition. In contrast, a positive shift to the value around −126 mV vs. Pt was observed when the beam was exposed at various dose rates of 0.7, 1.2, and 2.1 $e^{-}\cdot Å^{-2}\cdot s^{-1}$ (FIG. 3B, inset). After the beam exposure with these conditions, the reduction peak potential shifts back to the initial value with a high reproducibility as indicated by the almost entirely overlapping cyclic voltammograms under the beam-off and beam-on conditions. Since these voltammograms were measured continuously during the experiments, the reduction peak potentials can be plotted as a function of time, as shown in FIG. 3C. Based on the initial pH value of the unbuffered electrolyte containing 0.01 M $H_2Q$ and 0.1 M KCl and the slope of 35.7 mV/pH obtained from the calibration curve, the reduction peak potentials can be converted to the pH values with the accuracy of ±0.15 pH. As expected from the simulation results (FIG. 1D), the pH value drops under the beam-on condition and increases back to the initial value under the beam-off condition at Location 1 (FIG. 3C). The pH fluctuation may seem to be more significant for higher beam dose; however, this difference is in the range of the accuracy (±0.15 pH) of the measurement.

Figure 3D:
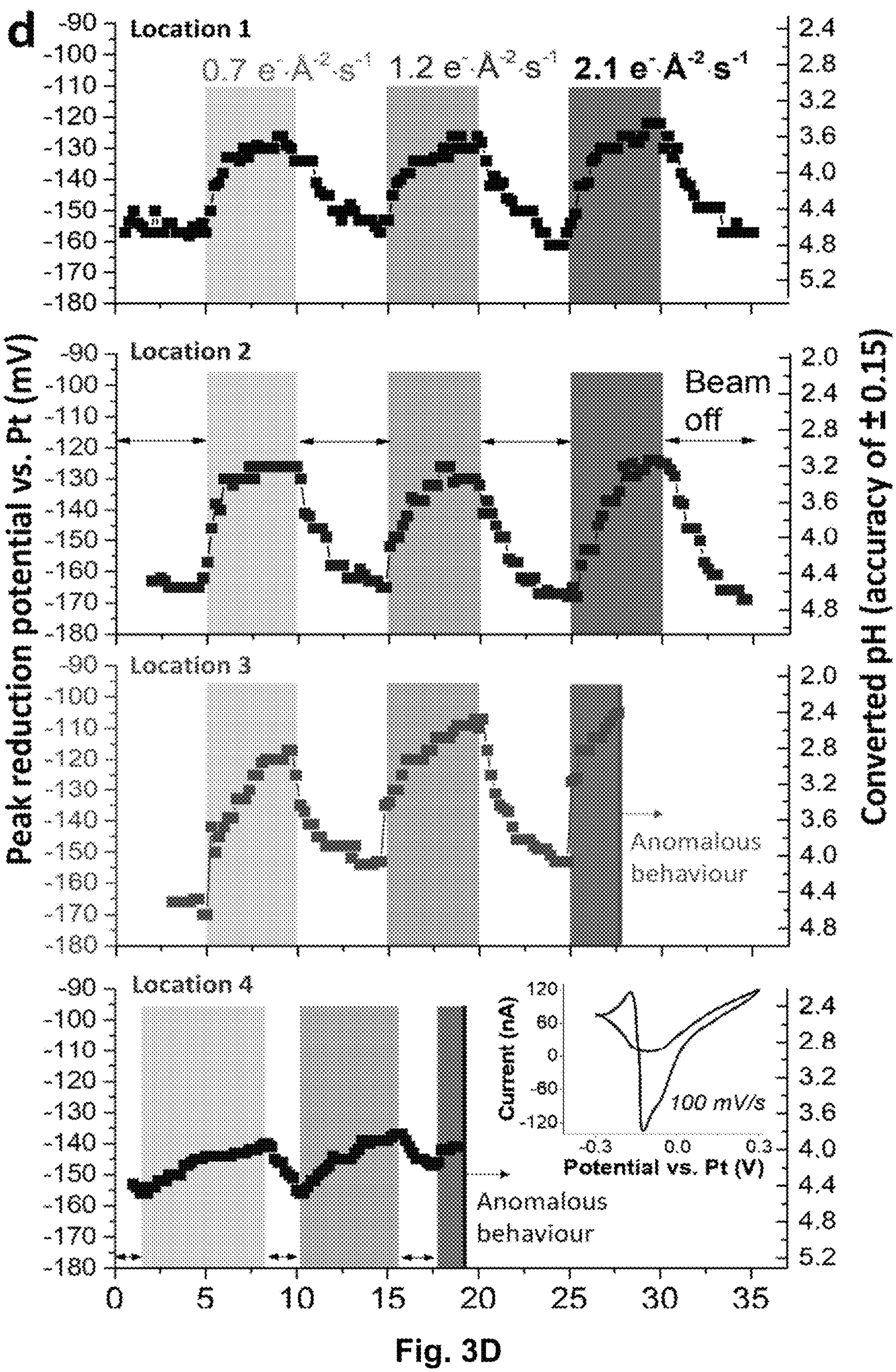

At Location 2, similar results were obtained with a slightly larger pH fluctuation as summarised in FIG. 3D (see also FIGS. 8A to 8H for details) while a notable difference can be seen when the beam exposed area is getting closer to the working electrode. For instance, at Location 3, the reduction peak value does not seem to return to the initial value during the beam-off condition (FIG. 3D). Furthermore, about 170 s after the beam exposure at the dose of 2.1 $e^{-}\cdot Å^{-2}\cdot s^{-1}$, a drastic change in the cyclic voltammogram takes place (FIG. 8C). Similar behaviour was also observed at Location 4 while this anomalous behaviour appeared earlier (FIG. 3D): about 100 s after the beam exposure at the dose of 2.1 $e^{-}\cdot Å^{-2}\cdot s^{-1}$. In both cases, the current becomes positive during the reduction scan at around −0.15 V vs. Pt with a subsequent oxidation peak. To the best of our knowledge, this electron beam-induced anomalous phenomenon has not been previously reported.

In fact, the anomalous oxidation peak during reduction scan has been reported in the case of electrochemical oxidation of alcohols such as glycerol, ethanol, and methanol. Among diverse opinions regarding the detailed interpretations of this oxidation peak during reduction scan, one possible explanation is that the deactivated electrode surface during oxidation became active again via the reduction of the surface during the reduction scan.[59, 60, 63] Investigating the exact origin of our observation caused by high electron beam dose is clearly beyond the scope of our work. However, we can assume that the origin of the observed anomalous oxidation peak during the reduction scan is the highly reactive species, which are produced as a result of radiolysis in the beam-exposed area such as hydrogen radical $H^{+}$ and hydroxyl radical $OH^{-}$ (FIG. 6A). These species can interact with the quinone/hydroquinone in the electrolyte and carbon electrode, particularly, in the latter case, CO and $CO_2$ can evolve as a consequence. Then, $CO_2$ can be further electrochemically reduced to other species like methanol.

Figure 4:
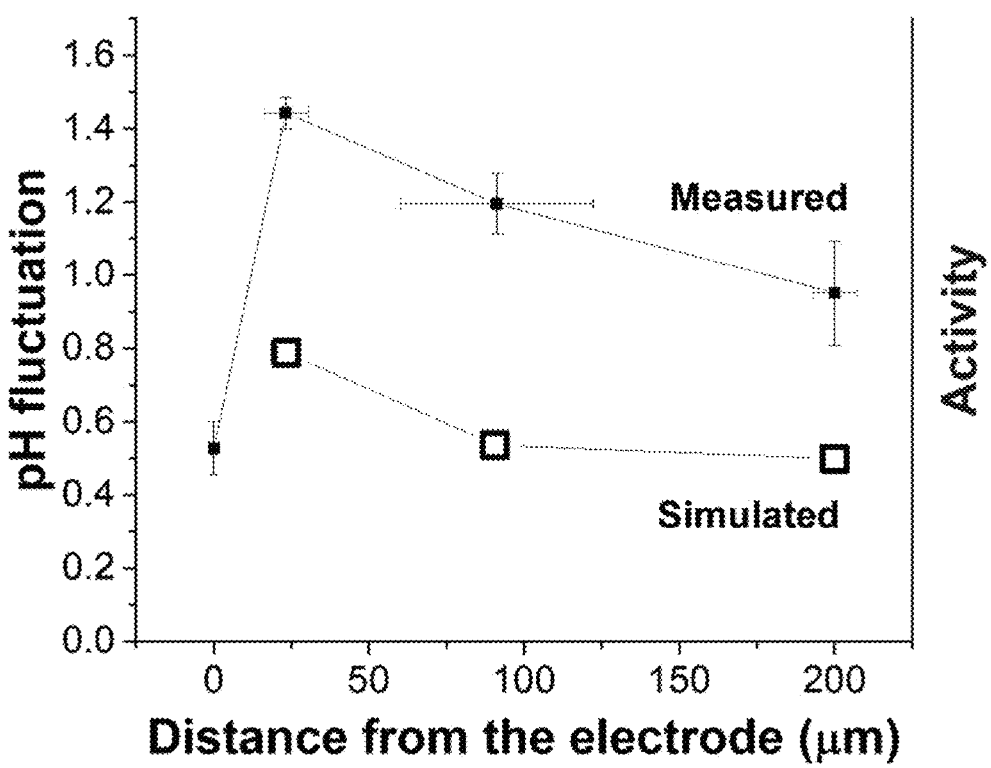
FIG. 4 shows measured reduction potentials of 0.01 M $H_2Q$ aqueous solution at various locations are first converted to the pH value; accordingly, the level of pH fluctuation is plotted as a function of the distance between the beam location and the working electrode.

The occurrence of the anomalous cyclic voltammogram indicates that the electrochemical experiment is strongly influenced by the radiolytic species; therefore, the approach of quantifying pH value via the $H_2Q/Q$ redox couple is no longer valid. Excluding these data points obtained at the dose rate of 2.1 $e^{-}\cdot Å^{-2}\cdot s^{-1}$, the pH fluctuation values observed under the beam-on and beam-off conditions are now plotted as a function of the distance from the centre of the beam exposed area to the edge of the electrode in FIG. 4. As the beam exposure area is getting closer to the electrode, the pH fluctuation is getting more significant, which is also in line with the simulation results. When the beam was exposed directly on the electrode, a comparably low level of pH fluctuation was experimentally observed, which is the opposite to the prediction of the simulation that the $H^{+}$ concentration is the highest in the beam-exposed area (see FIG. 6C).

As discussed earlier with our simulation results, the radiolytic species are generated in the beam exposed area and diffuse through space while various chemical reactions occur at various kinetics. In this complex and dynamic system, the pH fluctuation we represented in FIG. 4 for the case of the beam exposure directly on the electrode should be instead discussed in terms of the reaction activity of $H^{+}$.

According to our simulation at 0.7 $e^{-}\cdot\text{Å}^{-2}\cdot s^{-1}$, the concentration of $H^+$ ions is as high as 2.8 mM in the beam exposed area; however, these $H^+$ ions will not only encounter the HQ/H reaction described in Equation 3 but also reactions with other radiolytic species. For instance, neutralisation reaction takes place due to the presence of $OH^-$ also generated as a result of radiolysis in the beam exposed area. Therefore, the experimentally determined pH fluctuation at the beam exposed area discussed earlier in FIG. 4 should be recognised rather as the activity of the $H^+$; the pH values obtained away (>10 μm) from the electrode are still valid based on the negligible influence of neutralisation process as also evidenced by stable $pK_w$ values from the simulation (FIG. 6D).

From our simulation alone, the activity of the $H^+$ for the HQ/H redox reaction at the beam exposed area cannot be accurately quantified. Nevertheless, as evidenced by the high concentration of other radiolytic species such as $OH^-$ at the beam exposed area, our simulation results imply that the effective concentration of the $H^+$ for the HQ/H reaction should be much lower than the predicted $H^+$ concentration. This observation from the simulation is in line with the experimental results that the activity of the beam-induced $H^+$ is not the highest at the beam exposed area but at its periphery. The slight differences between the values obtained from the experiments and the simulations are considered to be due to the absence of detailed modelling elements such as beam broadening, liquid thickness effects, and precise beam conditions and liquid cell geometry. In this study, the simulation had been carried out for the stationary beam with the radious of 0.5 nm for the cylindrical liquid volume with a radius of 200 μm. So far, the beam-induced radiolyis process has been assumed to be homogeneous along the depth of the liquid sample based on the thin liquid layer condition in the case that the mean free path of the electron is on the order of the liquid layer or larger. However, the commercially available in-situ electrochemical TEM cells are often designed with a thickness over 500 nm; in this study, the liquid thickness was 1000 nm. Recently, the effects of beam broadening have been reported for a general beam damage mechanisms. Furthermore, the latter model enables simulating various beam conditions and diffusions in 3-dimensional directions; therefore, integrating our STEM radiolysis model to their model this beam broadening model seems to be promising for follow-up studies.

We have simulated the radiolysis process under a scanning transmission electron microscopy condition in a water-filled in-situ holder, particularly for $H^+$ and $OH^-$ ions due to their critical roles in diverse aqueous chemical systems. By investigating a pH-sensitive quinone/hydroquinone ($Q/H_2Q$) redox couple, we also established a special methodology for quantitative analysis of beam-induced $H^+$ ion in liquid in-situ TEM holder. For the first time, this unique approach enabled investigating the dependency of dose-rate, electron beam location, and irradiation time on the $H^+$ concentration and its chemical activity. Our radiolysis simulation predicted that the pH decreases upon electron beam irradiation and returns back to its initial concentration after the irradiation. This predicted trend in pH fluctuation upon the beam-on and beam-off condition was experimentally confirmed by measuring the reduction potential of 0.01 M $H_2Q$ aqueous solution. This measured reduction potential was converted to the pH value based on the correlation between the HQ/Q redox potential and the pH of the electrolyte. Furthermore, our simulation also predicted an almost equally high concentration of $OH^-$ to that of $H^+$ ions in the beam exposed area. Considering the possible series of reactions involving neutralisation, it is expected that not all of the beam-induced $H^+$ ions will be actively involved in other chemical reactions in the liquid cell system; for instance, with the solid-state samples such as carbon electrode. As expected, the activity of the $H^+$ ions was experimentally measured to be lower in the beam-exposed area than the rest of the locations. Our results from both experiments and simulation indicate that the maximum effect of the beam-induced hydronium is the periphery of the beam-exposed area. Also, we determined that the threshold beam dose of 2.1 $e^{-}\cdot\text{Å}^{-2}\cdot s^{-1}$ for electrochemical analysis with the glassy carbon electrode as a severe interference occurred in cyclic voltammetry with the $H_2Q$-containing electrolyte. Our simulation and experimental work reveal the detailed behaviour of the electron beam-induced hydronium regarding the liquid in-situ TEM analysis. Besides, our unique analytical approach for the quantitative measurement of hydronium activity and concentration is believed to be beneficial for the research community in terms of understanding the comprehensive radiolysis process as well as to prevent undesired radiolytic species during in-situ TEM analysis.

Experimental Methods pH Calibration Curve

To establish the correlation between the pH value of the electrolyte and the formal redox potential of the HQ/Q couple, we prepared 4 electrolytes with 0.01 M HQ (Sigma-Aldrich, >99% purity) and 0.1 M KCl (Sigma-Aldrich, >99% purity) in four buffered aqueous solutions. 0.1 M KCl was introduced as a supporting electrolyte to minimise the ion migration effect. The buffered solutions for pH 3, 5, and 7 were prepared by mixing 0.1 M citric acid (Sigma-Aldrich >99.5% purity) and 0.2 M dibasic sodium phosphate (Sigma-Aldrich, >99% purity) while 0.1 M sodium borate pH 9 buffered solution was prepared with boric acid (Sigma-Aldrich, >99.5% purity) and sodium hydroxide (Sigma-Aldrich, >98% purity). The electrolytes were flushed with nitrogen gas bubble before experiments to deplete dissolved oxygen.

The pH values of the 0.01 M HQ and 0.1 KCl electrolytes in 4 buffered solutions were measured before electrochemical characterisations by a VMP300 potentiostat/galvanostat (Bio-Logic) in PJES-3031 in-situ liquid TEM holder with the type ECT-45CR and EPB-55GF chips (Protochips). The electrolyte was dropped on the EPB-55GF bottom chip before the cell was enclosed with the ECT-45CR top chip and the cell lid. After the cell assembly, various electrolytes were introduced through the flow channel of the in-situ holder via a gas-tight syringe.

Approximately 4 hours resting time was introduced after the introduction of the electrolyte before cyclic voltammetry was applied.

The geometry of the cell leads to the thickness of 1000 nm for the electrolyte, which is enclosed by the top and bottom silicon nitride window (thickness of 50 nm each).

In-Situ Transmission Electron Microscopy

Electron micrographs were recorded by an aberration-corrected JEOL JEM-2100 with an operating voltage of 200 keV during the electrochemical measurements of the in-situ liquid holder. After introducing 4 hours resting time after the electrolyte was introduced to the cell, the electrochemical measurements were carried out in a floating mode while the potentiostat was grounded to the STEM chassis.

Figure 5:
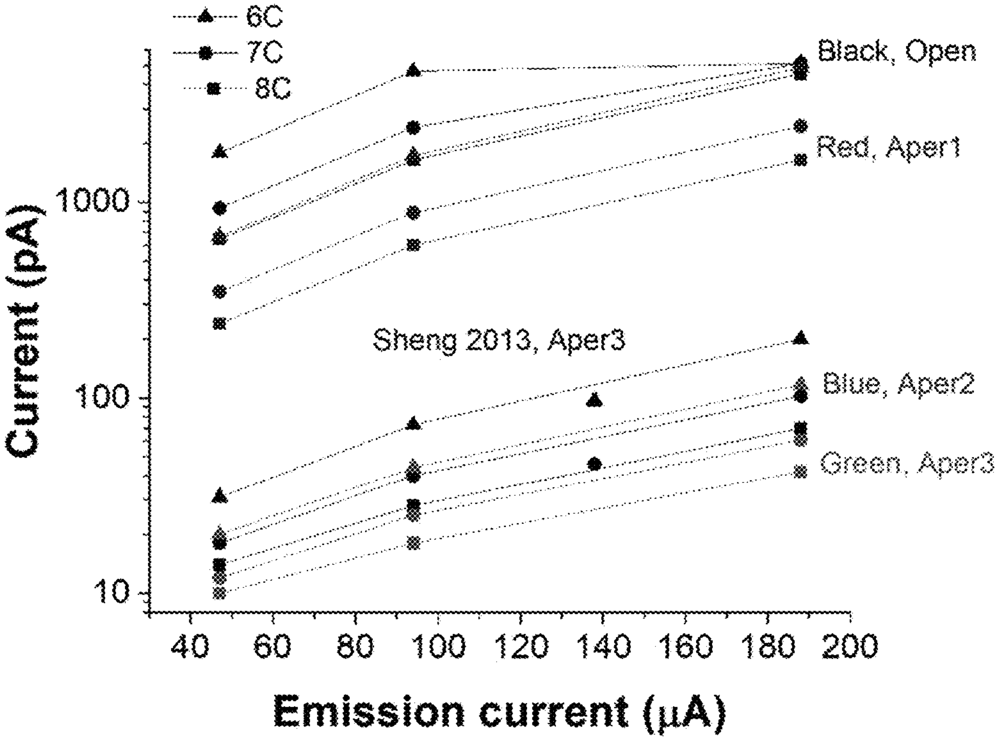
FIG. 5 shows measured beam current density from the small fluorescent screen multiplied by 10 $cm^2$ for converting to the beam current. Aperture 1, 2, 3 are the largest, the second largest, and the third largest in size, respectively. The converted values are close to the values reported in Ref 1.

The detailed microscopic parameters applied for the image recording are the followings: 1024×1024 pixels, dwell time of 3 μs, and the beam emission currents of 100, 150, and 200 μA. Under the latter conditions, the beam currents are expected to be about 0.62, 1.08, 1.88 nA based our rough calculations (FIG. 5). Accordingly, the electron beam dose of 0.7, 1.2, and 2.1 $e^{-}\cdot Å^{-2}\cdot s^{-1}$ are expected.

Simulation

The STEM simulation has been carried out for the beam dose of 0.7, 1.2, and 2.1 $e^{-}\cdot Å^{-2}\cdot s^{-1}$ at High Performance Computing facility with a parallel Linux cluster (Barkla) by applying 40 cores in the University of Liverpool.

Method

Figures 10, 11:
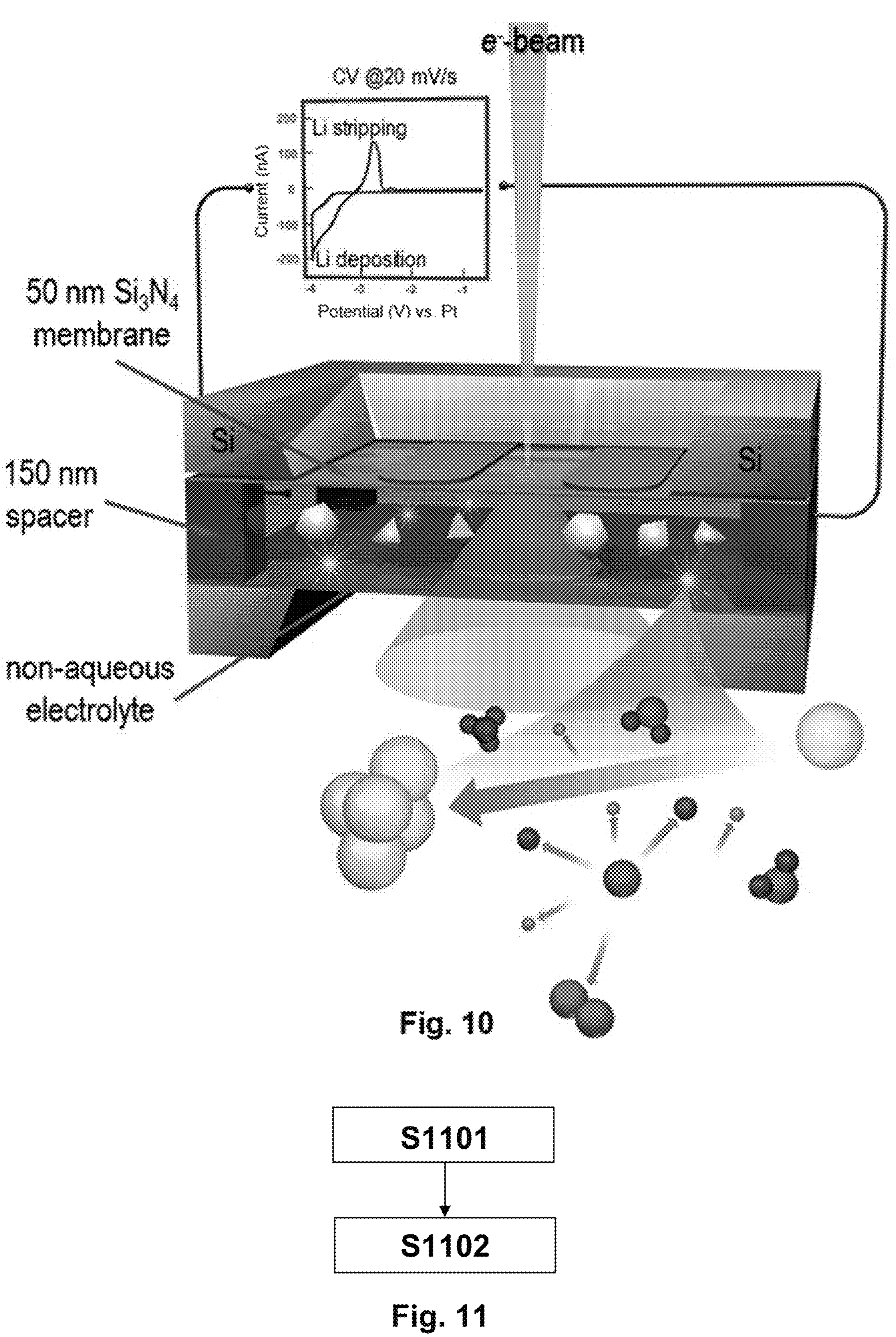
FIG. 10 schematically depicts the design of the electrochemical liquid TEM cell.
FIG. 11 schematically depicts a method according to an exemplary embodiment.

FIG. 11 schematically depicts a method according to an exemplary embodiment. The method is of characterizing a liquid exposed to ionizing radiation.

At S1101, the method comprises including an oxidizing agent and/or a reducing agent of a redox pair in the liquid, thereby providing a corresponding redox couple.

At S1101, the method comprises determining a first redox potential due, at least in part, to the redox couple while exposing the liquid to the ionizing radiation.

The method may include any of the steps described herein.

Although a preferred embodiment has been shown and described, it will be appreciated by those skilled in the art that various changes and modifications might be made without departing from the scope of the invention, as defined in the appended claims and as described above.

In summary, the emergence of liquid-filled transmission electron microscopy (TEM) analysis has brought a paradigm shift in understanding science and technologies. It has successfully converted the post-mortem to the in-situ perspective of perceiving the micro, nano, and sub-nanometre world of liquid-filled environment. The one greatest remaining challenge for the liquid-filled in-situ TEM analysis is the comprehensive understanding of electron beam-induced radiolysis process which may severely interfere with the intended experiments. So far, a few theoretical works have been established to predict the radiolysis behaviour in the water-filled environment with limited experimental support. For the latter, only a visible species such as $H_2$ and $O_2$ gas bubble formation has been correlated with the theoretical prediction. Experimental quantification of the other species is technologically demanding due to extremely limited space in the in-situ holder. For this reason, despite the critical roles of beam-induced hydronium ions in broad chemical reaction systems, no experimental work has been established yet to address the beam-induced hydronium ions in water-filled environment quantitatively. To the best of the inventors' knowledge, despite the critical roles of hydronium ($H^+$) in broad chemical reaction systems, no experimental work, however, has been demonstrated for quantitative analysis of the electron beam-induced hydronium and their reaction activities yet. The inventors have investigated the detailed radiolysis behaviour for water-filled in-situ scanning transmission electron microscopy analysis (STEM) both theoretically and experimentally. Particularly, the inventors have demonstrated a facile approach to measure the concentration and reaction activity of the radiolytic products by relying on electrochemical sensing mechanism which can be applied not only for $H^+$ ions but also many other radiolytic species. Hence, the inventors have detailed the behaviour of beam-induced hydronium and its influence on the chemical reaction in the sample by relying both on the theoretical simulation and the experiment for water-filled in-situ scanning transmission electron microscopy (STEM). By applying electrochemical sensing mechanism with quinone/hydroquinone redox couple, the inventors have demonstrated the quantitative analysis for the beam-induced hydronium concentration and its reaction activity. With this approach, a fluctuation of the hydronium concentration predicted from the theoretical simulation was experimentally confirmed by in-situ electrochemical STEM analysis. According to the results, the reaction activity of beam-induced hydronium is the highest at the periphery of the beam-exposed area. Since the approach, being based on the electrochemical sensing, is also available for the other radiolytic products, the inventors bring new insight to the research community of changing the paradigm from unperceivable matter to perceivable.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims and drawings), and/or all of the steps of any method or process so disclosed, may be combined in any combination, except combinations where at most some of such features and/or steps are mutually exclusive.

Each feature disclosed in this specification (including any accompanying claims, and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims and drawings), or to any novel one, or any novel combination, of the steps of any method or process so disclosed.

The invention claimed is:

1. A method of characterizing a liquid exposed to ionizing radiation, the method comprising:

(a) including an oxidizing agent and/or a reducing agent of a redox pair in the liquid, thereby providing a corresponding redox couple; and (b) determining a first redox potential due, at least in part, to the redox couple while exposing the liquid to the ionizing radiation, wherein determination of the first redox potential and exposure to the ionizing radiation are simultaneous.

2. The method according to claim 1, wherein the liquid comprises and/or is an aqueous solution.

3. The method according to claim 1, wherein the ionizing radiation comprises and/or is: electrons; ions; α, β, and/or γ radiation; or X-rays.

4. The method according to claim 1, wherein the redox couple includes $H^+$.

5. The method according to claim 4, wherein the redox pair comprises and/or is quinone/hydroquinone or an iron-sulfur protein (ISP).

6. The method according to claim 1, wherein determining the first redox potential is by potentiometry or voltammetry.

7. The method according to claim 1, further comprising exposing the liquid to the ionizing radiation, wherein exposing the liquid to the ionising radiation comprises imaging the liquid using the ionizing radiation.

8. The method according to claim 7, wherein imaging the liquid comprises electron microscopy.

9. The method according to claim 1, further comprising calculating a pH of the liquid using the determined first redox potential.

10. The method according to claim 9, further comprising calibrating the pH.

11. The method according to claim 9, wherein including the oxidizing agent and/or the reducing agent of the redox pair in the liquid comprises applying the oxidizing agent and/or the reducing agent of the redox pair to a solid and contacting the liquid and the solid.

12. The method according to claim 1, further comprising including a supporting electrolyte in the liquid.

13. The method according to claim 1, further comprising determining the first redox potential repeatedly.

14. The method according to claim 1, further comprising determining a second redox potential due, at least in part, to the redox couple in the absence of the ionizing radiation and comparing the second redox potential and the first redox potential.

15. An electrochemical liquid-phase transmission electron microscopy (TEM) cell comprising an oxidizing agent and/or a reducing agent of a redox pair for contacting with a liquid receivable therein.

* * * * *